(12) United States Patent
Nakai et al.

(10) Patent No.: US 9,419,553 B2
(45) Date of Patent: Aug. 16, 2016

(54) APPARATUS FOR CONTROLLING ROTARY MACHINE

(71) Applicant: DENSO CORPORATION, Kariya, Aichi-pref. (JP)

(72) Inventors: Yasuhiro Nakai, Kariya (JP); Hajime Uematsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/805,167

(22) Filed: Jul. 21, 2015

(65) Prior Publication Data

US 2016/0028340 A1  Jan. 28, 2016

(30) Foreign Application Priority Data

Jul. 25, 2014 (JP) ................................. 2014-152338
Jul. 30, 2014 (JP) ................................. 2014-154935

(51) Int. Cl.
*H02P 21/00* (2016.01)
*H02P 21/06* (2016.01)

(52) U.S. Cl.
CPC ..................................... *H02P 21/06* (2013.01)

(58) Field of Classification Search
CPC ........... H02P 6/08; H02P 6/181; H02P 6/182; H02P 6/14
USPC ................................................... 318/400.02
See application file for complete search history.

(56) References Cited

U.S. PATENT DOCUMENTS

| 2002/0097015 | A1 | 7/2002 | Kitajima et al. | |
| 2009/0237022 | A1 | 9/2009 | Yamamoto et al. | |
| 2011/0204831 | A1* | 8/2011 | Iwaji | B60L 15/025 318/244 |
| 2014/0340012 | A1* | 11/2014 | Aiba | H02P 23/0081 318/400.15 |
| 2015/0145459 | A1* | 5/2015 | Guzelgunler | H02P 27/04 318/490 |
| 2015/0333681 | A1 | 11/2015 | Matsuki et al. | |

FOREIGN PATENT DOCUMENTS

| JP | 2002-010686 A | 1/2002 |
| JP | 3852289 B2 | 11/2006 |
| JP | 2009-232530 A | 10/2009 |
| JP | 2012-023943 A | 2/2012 |
| JP | 2015-220884 A | 12/2015 |

* cited by examiner

*Primary Examiner* — Erick Glass
(74) *Attorney, Agent, or Firm* — Oliff PLC

(57) ABSTRACT

In a control apparatus, a target harmonic current obtainer obtains, according to a phase current flowing through at least one phase winding of a stator of a rotary machine, a target harmonic current component flowing in the rotary machine. The target harmonic current component correlates with a fundamental current component of a phase current. An inducing unit superimposes, on at least one of the amplitude and the phase of an output voltage vector of a power converter used by a switching unit, a harmonic signal that changes at an angular velocity identical to an angular velocity of the target harmonic current component. This induces a counteracting harmonic current component in the at least one phase winding. The counteracting harmonic current component counteracts the target harmonic current component.

8 Claims, 7 Drawing Sheets

APPARATUS FOR CONTROLLING ROTARY MACHINE

CROSS REFERENCE TO RELATED APPLICATIONS

This application is based on and claims the benefit of priority from each of Japanese Patent Applications 2014-152338 and 2014-154935 respectively filed on Jul. 25, 2014 and Jul. 30, 2014, the disclosure of each of which is incorporated in its entirety herein by reference.

TECHNICAL FIELD

The present disclosure relates to apparatuses for controlling a rotary machine electrically connected to a power converter having a switching element.

BACKGROUND

There are various methods for controlling on-off switching operations of switching elements to control harmonic current components, one of which is disclosed in Japanese Patent Publication No. 3852289. The disclosed method compares a command current value determined from a value of required torque and such harmonic current components with a carrier signal having an amplitude predetermined based on the amplitude of the sinusoidal command voltage. Then, the disclosed method performs pulse-width modulation (PWM) control based on the results of the comparison. The PWM control cyclically generates a drive pulse signal for driving each switching element while adjusting a duty cycle of the drive pulse signal based on the results of the comparison for each switching cycle.

SUMMARY

Another method is known to control on-off switching operations of the switching elements of the inverter. This method uses on-off switching patterns, i.e. on-off pulse patterns, for each of the switching elements. Specifically, a control apparatus includes a storage in which a plurality of on-off switching patterns each predetermined for a corresponding value of the amplitude of an output voltage vector of the inverter; each of the on-off switching patterns is associated with a corresponding value of an electrical rotational angle of the motor.

Specifically, the control apparatus determines a phase of the output voltage vector of the inverter in a first-order rotating coordinate system, which is defined as a coordinate system that rotates at an angular velocity that is identical to a fluctuating angular velocity of a fundamental component of a current flowing in the motor in a three-phase fixed coordinate system. The phase of the output voltage vector serves as a manipulated variable for feedback controlling a controlled variable, such as torque, of the motor to a target value. The control apparatus selects, for each of the switching elements, one of the on-off switching patterns matching with a value of the amplitude of the output voltage vector. Then, the control apparatus shifts the selected on-off switching pattern for each of the switching elements by the determined phase of the output voltage vector relative to a present value of the electrical rotational angle of the motor. The control apparatus alternately switches on and off each of the switching elements according to a corresponding one of the shifted on-off switching patterns.

Unfortunately, there are no specific methods for cancelling harmonic current components included in a phase current using such on-off switching patterns. Users for motors therefore desire one or more specific methods for cancelling harmonic current components included in a phase current using such on-off switching patterns.

In view of the circumstances set forth above, one aspect of the present disclosure seeks to provide apparatuses for controlling a rotary machine, which are capable of addressing such desires of users for motors.

Specifically, an alternative aspect of the present disclosure aims to provide such apparatuses, each of which is capable of reducing a harmonic current component flowing in a rotary machine using on-off switching patterns for a switching element of a power converter.

According to an exemplary aspect of the present disclosure, there is provided an apparatus for feedback controlling a controlled variable of a rotary machine to thereby rotate a rotor relative to a stator using power obtained by a power converter. The apparatus includes a phase setter configured to set a phase of an output voltage vector of the power converter in a rotating coordinate system. The phase of the output voltage vector serves as a first manipulated variable for feedback controlling the controlled variable of the rotary machine to a target value. The phase setter is also configured to output phase information including the phase of the output voltage and an electrical rotational angle of the rotor. The rotating coordinate system rotates as the rotor of the rotary machine rotates. The apparatus includes an amplitude setter configured to set an amplitude of the output voltage vector of the power converter in the rotating coordinate system. The amplitude of the output voltage vector serves as a second manipulated variable for feedback controlling the controlled variable of the rotary machine to the target value. The apparatus includes a storage configured to store therein on-off switching patterns of a switching element of the power converter. The on-off switching patterns are provided for respective predetermined values of an amplitude parameter depending on the amplitude of the output voltage vector. The apparatus includes a switching unit configured to (1) Select one of the on-off switching patterns corresponding to a specified value of the amplitude parameter (2) Extract an on or off instruction from the selected one of the on-off switching patterns according to a change of the phase information output from the phase setter (3) Switch on or off the switching element according to the extracted on or off instruction.

The apparatus includes a target harmonic current obtainer configured to obtain, according to a phase current flowing through at least one phase winding of the stator, a target harmonic current component flowing in the rotary machine. The target harmonic current component correlates with a fundamental current component of the phase current. The apparatus includes an inducing unit configured to superimpose, on at least one of the amplitude and the phase of the output voltage vector used by the switching unit, a harmonic signal to induce a counteracting harmonic current component in the at least one phase winding. The harmonic signal changes at an angular velocity identical to an angular velocity of the target harmonic current component. The counteracting harmonic current component counteracts the target harmonic current component.

This configuration superimposes, on at least one of the amplitude and phase of the output voltage vector used by the switching unit, a harmonic signal; the harmonic signal changes at an angular velocity identical to an angular velocity of the target harmonic current component. This induces the counteracting harmonic current component in the at least one phase winding. The counteracting harmonic current component induced in the at least one phase winding counteracts the target harmonic current component, thus reducing the target harmonic current component. This reduces torque variations and/or iron loss of the rotary machine due to the target harmonic current component.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
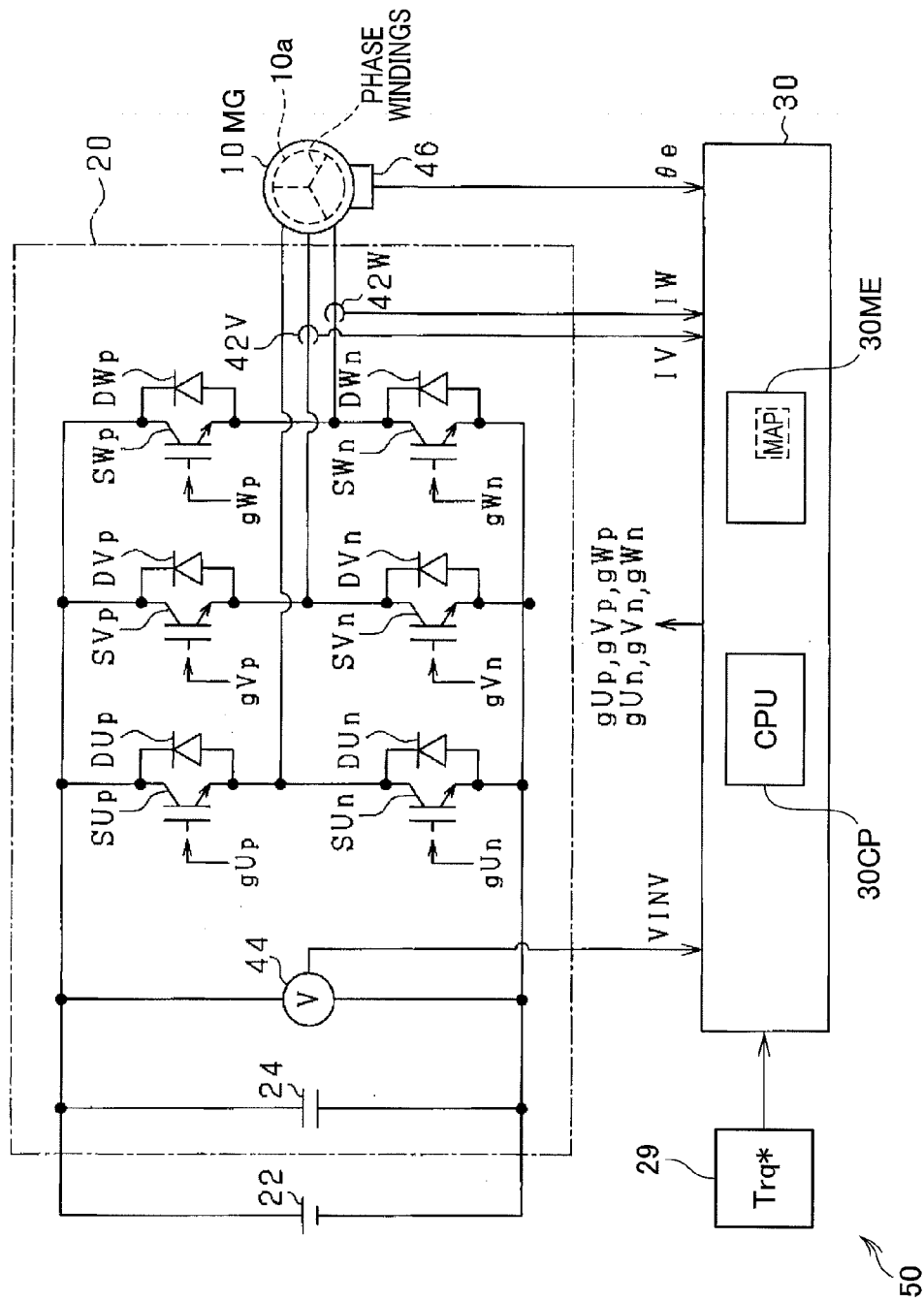
FIG. 1 is a circuit diagram of a control apparatus for controlling a motor-generator according to the first embodiment of the present disclosure.

The following describes embodiments of the present disclosure with reference to the accompanying drawings. In the embodiments, like parts between the embodiments, to which like reference characters are assigned, are omitted or simplified to avoid redundant description.

First Embodiment

Referring to FIG. 1, the first embodiment of the present disclosure illustrates in FIG. 1 a three-phase motor-generator, referred to simply as "motor-generator" 10 installed in a target vehicle as an example of rotary machines. Each of the embodiments uses a motor having a salient-pole structure as the motor-generator 10. For example, each of the embodiments uses an interior permanent magnet synchronous motor (IPMSM) as the motor-generator 10.

FIG. 1 also illustrates a control system 50. The control system 50 is equipped with an inverter 20 serving as a power converter, a high-voltage battery 22 serving as a DC power supply, a smoothing capacitor 24, a control system 26, and a control apparatus 30.

The motor-generator 10 and the high-voltage battery 12 can establish electrical connection therebetween via the inverter 20.

For example, the motor-generator 10 is provided with an annular rotor 10a having an iron rotor core and rotatably disposed in the motor-generator 10. The iron rotor core is, for example, directly or indirectly coupled to a crankshaft of an engine installed in the target vehicle to be rotatable together with the crankshaft.

The rotor 10a has a salient-pole structure.

The rotor core of the rotor 10a is specifically provided at its circumferential portions with at least one pair of peg manent magnets. The permanent magnets of the at least one pair are so embedded in the outer periphery of the rotor core as to be symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor 10a has a direct axis (d-axis) in line with a direction of magnetic flux created by the N pole, in other words, in line with an N-pole center line. The rotor 10a also has a quadrature axis (q-axis) with a phase being $\pi/2$-radian electrical angle leading with respect to a corresponding d-axis during rotation of the rotor 10a. In other words, the q-axis is electromagnetically perpendicular to the d-axis.

The d and q axes constitute a d-q coordinate system, i.e. a first-order rotating coordinate system, defined relative to the rotor 10a of the motor-generator 10. The first-order rotating coordinate system is defined as a coordinate system that rotates at an angular velocity identical to an angular velocity of a fundamental component of a phase current flowing in the motor-generator 10 in the three-phase fixed coordinate system.

An inductance Ld in the d-axis is lower than an inductance Lq in the q-axis because the permanent magnets have a magnetic permeability constant lower than that of the iron. Motors having a salient-pole structure means motors each having this inductance characteristic of the rotor 10a.

The motor-generator 10 is also provided with a stator. The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

For example, the stator core also has a plurality of slots. The slots are formed through the stator core and are circumferentially arranged at given intervals. The stator also includes a set of three-phase windings, i.e. armature windings, wound in the slots of the stator.

The three-phase windings, i.e. U-, V-, and W-phase windings, are wound in the slots such that the U-, V-, and W-phase windings are shifted, i.e. offset, by an electrical angle of, for example, 2π/3 radian in phase from each other.

For example, the three-phase armature windings, i.e. U-, V-, and W-phase windings, each have one end connected to a common junction, i.e. a neutral point, and the other end to a separate terminal in, for example, a star-configuration.

The motor-generator 10 is operative to receive, at each of the three-phase windings, one of the three phase currents to thereby generate a rotating magnetic flux; this allows the rotor 10a to turn based on magnetic attractive force between the rotating magnetic flux and a magnetic flux of the rotor 10a.

The high-voltage battery 22 is capable of outputting a voltage equal to or higher than 100 V. The smoothing capacitor 24 is disposed between the high-voltage battery 22 and the inverter 20. The smoothing capacitor 24 is operative to smooth the output voltage from the high-voltage battery 22, and supply the smoothed output voltage to the inverter 20 as input voltage.

The inverter 20 is designed as a three-phase inverter. The inverter 20 is provided with a first pair of series-connected upper- and lower-arm (high- and low-side) U-phase switching elements SUp and SUn, a second pair of series-connected upper- and lower-arm V-phase switching elements SVp and SVn, and a third pair of series-connected upper- and lower-arm W-phase switching elements SWp and SWn. The inverter 20 is also provided with flywheel diodes DUp, DUn, DVp, DVn, DWp, and DWn electrically connected in antiparallel to the respective switching elements SUp, SUn, SVp, SVn, SWp, and SWn.

In the first embodiment, as the switching elements S&# (&=U, V, and W, and #=p and n), IGBTs are respectively used.

When power MOSFETs are used as the switching elements S&#, intrinsic diodes of the power MOSFETs can be used as the flywheel diodes, thus eliminating the need for external flywheel diodes.

The first to third pairs of switching elements are parallely connected to each other in bridge configuration.

A connection point through which the switching elements SUp and SUn of the first pair are connected to each other in series is connected to an output lead extending from the separate terminal of the U-phase winding. Similarly, a connection point through which the switching elements SVp and SVn of the second pair are connected to each other in series is connected to an output lead extending from the separate end of the V-phase winding. Moreover, a connection point through which the switching elements SWp and SWn of the third pair are connected to each other in series is connected to an output lead extending from the separate end of the W-phase winding.

One end of the series-connected switching elements of each of the first, second, and third pairs is connected to the positive terminal of the high-voltage battery 22 via a positive terminal of the inverter 20. The other end of the series-connected switching elements of each of the first, second, and third pairs is connected to the negative terminal of the high-voltage battery 22 via a negative terminal of the inverter 20.

The control system 50 also includes current sensors 42V and 42W serving as, for example, phase-current measuring means, a voltage sensor 44 serving as, for example, voltage measuring means, and a rotational angle sensor 46 serving as, for example, a rotational angle measuring means.

The current sensor 42V is arranged to allow measurement of an instantaneous V-phase alternating current IV actually flowing through the V-phase winding of the stator. Similarly, the current sensor 42W is arranged to allow measurement of an instantaneous W-phase alternating current IW actually flowing through the W-phase winding of the stator.

The current sensors 42V and 42W are communicable with the control apparatus 30.

Each of the current sensors 42V and 42W is operative to send, to the control apparatus 30, the instantaneous value of a corresponding one of the V-, and W-phase alternating currents.

The voltage sensor 44 is arranged to allow measurement of the input voltage, referred to as an input voltage VINV, to be supplied to the inverter 20 from the high-voltage power source 22 via the smoothing capacitor 24. The voltage sensor 42 is communicable with the control apparatus 30, and operative to send, to the control apparatus 30, the input voltage VINV.

The rotational angle sensor 46 includes, for example, a resolver. The rotational angle sensor 46 is for example configured to measure, i.e. monitor, a rotational angle, i.e. an electrical rotational angle, θe of the rotor 10a of the motor-generator 10 every control cycle of the control apparatus 30 described later; the rotational angle θe of the rotor 10a of the motor-generator 10 represents a rotational angle of the d-axis of the rotor 10a. The rotational angle sensor 46 is communicable with the control apparatus 30, and operative to send, to the control apparatus 30, the monitored rotation angle θe of the rotor 10a every control cycle.

The control apparatus 30 is designed as, for example, a computer circuit including essentially, for example, a CPU 30CP and a memory 30ME serving as, for example, a storage according to the present disclosure.

The control apparatus 30 is connected to the control system 26 for inputting, to the control apparatus 30, target torque, i.e. request torque, Trq* for the motor-generator 10. For example, a control apparatus, which is higher in hierarchy than the control apparatus 30, can be used as the control system 26 if the control apparatuses are arranged in a hierarchical relationship.

The control apparatus 30 is designed to receive the measured values output from the sensors 42V, 42W, 44, and 46, and the target torque Trq* as received pieces of data. Then, the control apparatus 30 is designed to generate, based on the received pieces of data set forth above, drive signals, i.e. pulse-width modulated (PWM) signals, g&# for individually driving the respective switching elements S&# of the inverter 20.

The control apparatus 30 is designed to supply the drive signals g&# to the control terminals of the respective switching elements S&# of the inverter 20.

This individually turns on or off the respective switching elements S&#, thus converting the input voltage VINV into a controlled AC voltage, so that the controlled AC voltage is supplied to the motor-generator 10. The drive signals g&# aim to switch the respective switching elements S&# to feedback control at least one controlled variable, such as torque, generated by the motor-generator 10 so that the at least one controlled variable matches the target torque Trq*.

For example, the control apparatus outputs the drive signals g&# that complementarily turns on the upper- and lower-arm switching elements S&p and S&n of each pair while dead times during which the upper- and lower-arm switching elements S&p and S&n are simultaneously turned off are ensured. Introducing the dead time prevents the upper and lower-arm switching elements S&p and S&n from being simultaneously on.

Each of the drive signals g&# has a predetermined duty factor, i.e. a controllable on-pulse width for each switching cycle, in other words, a predetermined ratio, i.e. percentage, of on duration to the total duration of each switching cycle for a corresponding one of the switching elements S&#.

Figure 2:
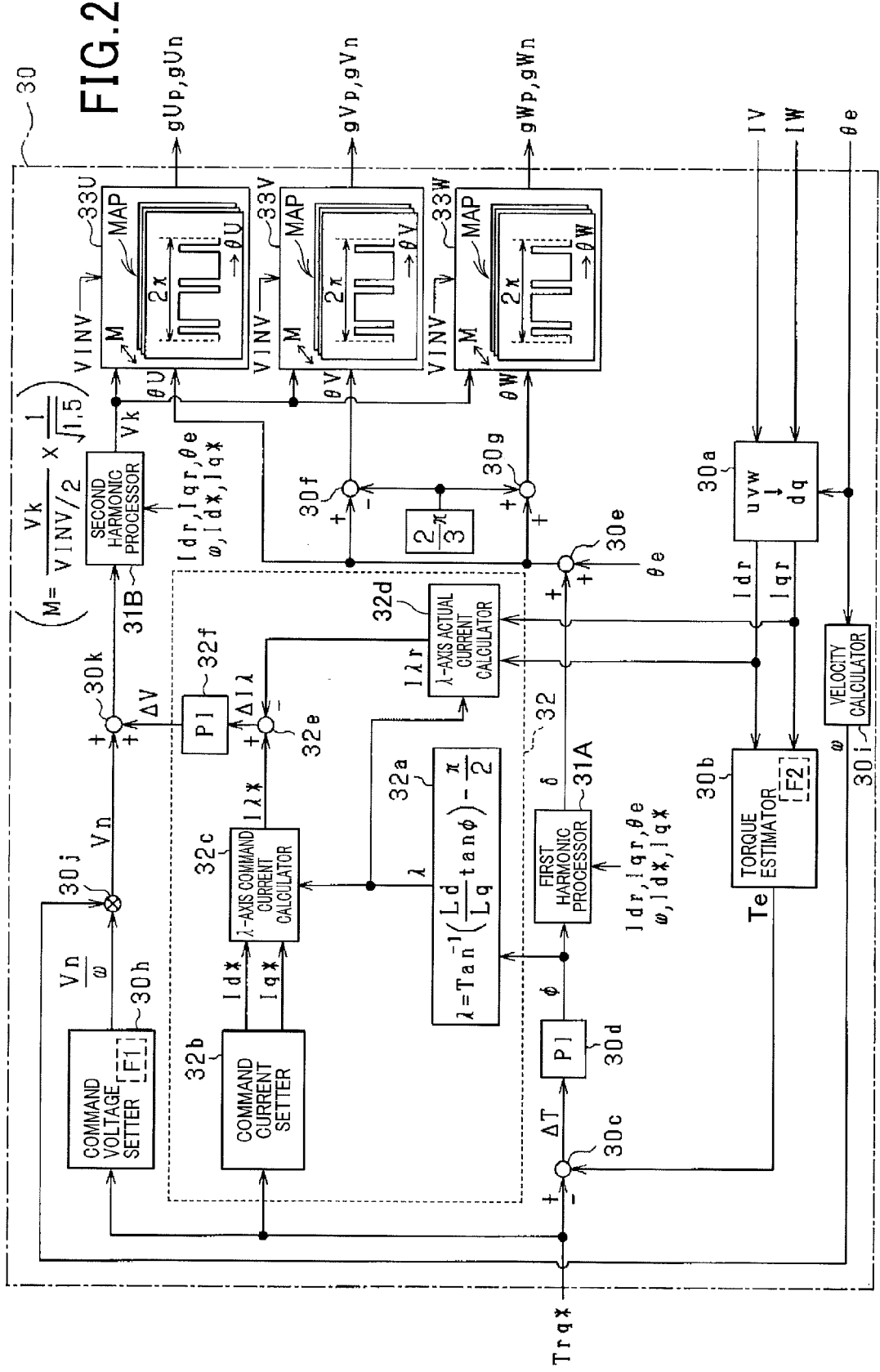
FIG. 2 is a block diagram schematically illustrating an example of the specific structure of a control apparatus illustrated in FIG. 1.

Next, the following describes an example of the specific structure of the control apparatus 30 for performing torque control, i.e. torque feedback control, including amplitude control and phase control, to generate the drive signals g&# for the respective switching elements S&p and S&n every predetermined control period with reference to FIG. 2.

As illustrated in FIG. 2, the control apparatus 30 includes a two-phase converter 30a, a torque estimator 30b, a torque deviation calculator 30c, a phase setter 30d, an electrical angle adder 30e, a first shifter 30f and a second shifter 30g. The control apparatus also includes a command voltage setter 30h, a velocity calculator 30i, a velocity multiplier 30j, a corrector 30k, a first harmonic processor 31A, a second harmonic processor 31B, a correction calculator 32, and U-, V-, and W-phase drive signal generators 33U, 33V, and 33W.

For example, the modules 30a to 30k, 31A, 31B, 32, and 33U to 33W cooperatively operate to carry out the torque control including the phase control and the amplitude control described in detail hereinafter. The modules 30a to 30k, 31A, 31B, 32, and 33U to 33W can be implemented as hardware modules, software modules, and/or hardware-software hybrid modules.

First, the following describes operations of some of the modules 30a to 30k, 31A, 31B, 32, and 33U to 33W for performing mainly the phase control.

The two-phase converter 30a, which serves as, for example, a two-phase converter, receives instantaneous V- and W-phase currents Iv and Iw measured by the respective current sensors 42V and 42W and the rotational angle θe of the d-axis of the rotor 10a measured by the rotational angle sensor 46.

The two-phase converter 30a calculates an instantaneous U-phase current IU based on the instantaneous V- and W-phase currents IV and IW in accordance with Kirchhoffs law. Then, the two-phase converter 30a converts the instantaneous U-, V-, and W-phase currents IU, IV, and IW in a three-phase fixed-coordinate system into d- and q-axis currents Idr and Iqr in the first-order rotating coordinate system, i.e. the d-q coordinate system, based on the electrical rotational angle θe of the rotor 10a. The stator coordinate system is fixedly defined relative to the stator; the stator coordinate system has fixed three axes corresponding to the three-phase windings of the stator. The two-phase converter 30a performs the conversion using correlations between the first-order rotating coordinate system and the stator coordinate system as a function of the electrical rotational angle θe.

The torque estimator 30b is operatively connected to the two-phase converter 30a. The torque estimator 30b is operative to calculate estimated torque Te for torque actually created by the motor-generator 10 based on the d-axis and q-axis currents Idr and Iqr input from the two-phase converter 30a.

For example, the torque estimator 30b calculates the estimated torque Te using, for example, information F1 in datatable (map) format, in mathematical expression format, and/or program format. The information F1, which is for example stored in the memory 30ME includes a function, i.e. correlation, of values of the estimated torque Te with respect to the pair of values of the d-axis current Idr, and values of the q-axis current Iqr. The torque estimator 30b can retrieve a value of the estimated torque Te corresponding to values of the d-axis and q-axis currents Idr and Iqr in the information F1.

When the information F1 includes one or more model equations, the one or more model equations are defined based on variables of the d-axis and q-axis currents Idr and Iqr. The torque estimator 30b can assign values of the d-axis and q-axis currents Idr and Iqr to the one or more model equations, thus calculating estimated torque Te.

The torque deviation calculator 30c is operatively connected to the torque estimator 30b, and subtracts the estimated torque Te from the target torque Trq* to thereby calculate a torque deviation ΔT between the estimated torque Te and the target torque Trq*. Note that the control apparatus 30 can include a filter, such as a low-pass filter, which eliminates high-frequency components, which are higher than a predetermined threshold frequency, from the estimated torque Te calculated by the torque estimator 30b. This modification can cause the torque deviation calculator 30c to subtract the corrected estimated torque Te from the target torque Trq* to thereby calculate the torque deviation ΔT between the corrected estimated torque Te and the target torque Trq*.

The phase setter 30d, which serves as, for example, a voltage phase setter, is operatively connected to the torque deviation calculator 30c. The phase setter 30d sets, i.e. calculates, based on the torque deviation ΔT, a phase φ of an output voltage vector Vnvt of the inverter 20 in the first-order rotating coordinate system. That is, the phase φ of the output voltage vector Vnvt serves as a manipulated variable for feedback controlling the estimated torque Te to match with the target torque Trq*. The voltage vector Vnvt has a d-axis voltage component Vd and a q-axis voltage component Vq in the first-order rotating coordinate system.

Specifically, the phase setter 30d according to the first embodiment calculates the phase φ of the output voltage vector Vnvt in accordance with a predetermined proportional gain and a predetermined integral gain, i.e. feedback gains, of a proportional-integral (PI) feedback control algorithm (PI algorithm) using the torque deviation ΔT as its input.

In the PI algorithm, the phase φ of the output voltage vector Vnvt is expressed based on the sum of an output, i.e. a proportional gain term, of a proportional unit based on the proportional gain and an output, i.e. an integral gain term, of an integrator based on the integral gain.

The proportional gain for the phase φ of the output voltage vector Vnvt contributes to change in the phase φ of the output voltage vector Vnvt in proportion to the temporal torque deviation ΔT from a target value of zero.

The integral gain is proportional to an accumulated offset of instantaneous values of the torque deviation ΔT over time to reset the accumulated offset (steady-state deviation) over time to zero.

The phase φ of the output voltage vector Vnvt, which will be referred to as a voltage phase φ, is defined such that a counter clockwise rotational direction from the positive side of the d-axis toward the positive side of the q-axis represents the positive direction of the voltage phase φ. The phase setter 30d advances, in accordance with the definition of the voltage phase φ, the voltage phase φ when the estimated torque Te is lower than the target torque Trq*. The phase setter 30d also delays, in accordance with the definition of the voltage phase φ, the voltage phase φ when the estimated torque Te is higher than the target torque Trq*.

The first harmonic processor 31A is operatively connected to the phase setter 30d. The first harmonic processor 31A superimposes a phase harmonic signal φr on the voltage phase φ output from the phase setter 30d, in other words, combines (synthesizes) the phase harmonic signal φr on the voltage phase φ. Detailed operations of the first harmonic processor 31A will be described later.

The electrical angle adder 30e is operatively connected to the phase setter 30d, and adds the electrical rotational angle θe to a voltage phase δ, which will be described later, including the voltage phase φ on which the phase harmonic signal φr is superimposed. Then, the electrical angle adder 30e outputs an angle (θe+δ) as a result of the addition.

The first shifter 30f is operatively connected to the electrical angle adder 30e, and subtracts an electrical angle of 2'/3 from the output angle (θe+δ) of the electrical angle adder 30e, thus shifting, i.e. advancing, the output angle (θe+δ) by the electrical angle of 2π/3.

The second shifter 30g is operatively connected to the electrical angle adder 30e, and adds an electrical angle of 2π/3 to the output angle (θe+δ) of the electrical angle adder 30e, thus shifting, i.e. retarding, the output angle (θe+δ) by the electrical angle of 2π/3.

This combination of the modules 30e, 30f, and 30g serves to generate a first reference angle θU equal to the angle (θe+δ) output from the module 30e, a second reference angle θV equal to the angle (θe+δ−2π/3) output from the module 30f, and a third reference angle θW equal to the angle (θe+δ+2π/3) output from the module 30g. These angles (θe+δ), (θe+δ−2π/3), and (θe+δ+2π/3) have been offset by an electrical angle of 2π/3 from each other.

Next, the following describes operations of some of the modules 30a to 30k, 31A, 31B, 32, and 33U to 33W for performing mainly the amplitude control.

The command-voltage setter 30h, which serves as a command amplitude setter, has, for example, information F2 in data-table (map) format, in mathematical expression format, and/or program format. The information F2, which is for example stored in the memory 30ME, includes a function, i.e. a correlation, of values of a normalized amplitude Vn/ω of the output voltage vector Vnvt in the first-order rotating coordinate system with respect to values of the target torque Trq*. The amplitude Vn of the output voltage vector Vnvt of the inverter 20 is defined as the square root of the sum of the square of the d-axis voltage component Vd and the square of the q-axis voltage component Vq of the output voltage vector Vnvt. The normalized amplitude Vn/ω of the output voltage vector Vnvt represents division of the command value of the amplitude Vn of the output voltage vector Vnvt from the inverter 20 by the electrical angular velocity ω of the rotor 10a.

The velocity calculator 30i is operatively connected to the command-voltage setter 30h, and calculates the electrical angular velocity ω of the rotor 10a based on the electrical rotational angle θe of the rotor 10a measured by the rotational angle sensor 46.

The velocity multiplier 30j is operatively connected to the command-voltage setter 30h and to the velocity calculator 30i, and multiplies the normalized command-voltage amplitude Vn/ω by the electrical angular velocity ω. This multiplication calculates a value of the amplitude Vn of the output voltage vector Vnvt. The value of the amplitude Vn of the output voltage vector Vnvt serves as a manipulated variable for feedforward controlling the torque of the motor-generator 10 to match with the target torque Trq*.

The corrector 30k is operatively connected to the velocity multiplier 30j, and adds, to the value of the amplitude Vn of the output voltage vector Vnvt output from the velocity multiplier 30j, an amplitude correction ΔV calculated by the correction calculator 32. This addition calculates the sum of the value of the amplitude Vn of the output voltage vector Vnvt and the amplitude correction ΔV, as a correction value of the value of the amplitude Vn of the output voltage vector Vnvt. The sum of the value of the amplitude Vn of the output voltage vector Vnvt and the amplitude correction ΔV will be referred to as a corrected voltage amplitude (Vn+ΔV) hereinafter. Detailed operations of the correction calculator 32 will be described later.

The second harmonic processor 31B is operatively connected to the corrector 30k. The second harmonic processor 31B superimposes an amplitude harmonic signal Vr on the corrected voltage amplitude (Vn+ΔV) output from the corrector 30k, i.e. combines (synthesizes) the amplitude harmonic signal Vr and the corrected voltage amplitude (Vn+ΔV). Detailed operations of the second harmonic processor 31B will be described later.

The U-phase drive signal generator 33U is operatively connected to the second harmonic processor 31B and the electrical angle adder 30e. The U-phase drive signal generator 33U generates U-phase drive signals gUp and gUn according to the corrected voltage amplitude (Vn+ΔV) on which the voltage harmonic signal Vr is superimposed, the first reference angle θU, and the input voltage VINV. Then, the U-phase drive signal generator 33U outputs the U-phase drive signals gUp and gUn to the control terminals of the respective U-phase switching elements SUp and SUn of the inverter 20, thus controlling on-off operations of the respective switches SUp and SUn.

The V-phase drive signal generator 33V is operatively connected to the second harmonic processor 31B and the first shifter 30f. The V-phase drive signal generator 33V generates V-phase drive signals gVp and gVn according to the corrected voltage amplitude (Vn+ΔV) on which the voltage harmonic signal Vr is superimposed, the second reference angle θV, and the input voltage VINV. Then, the V-phase drive signal generator 33V outputs the V-phase drive signals gVp and gVn to the control terminals of the respective V-phase switching elements SVp and SVn of the inverter 20, thus controlling on-off operations of the respective switches SVp and SVn.

The W-phase drive signal generator 33W is operatively connected to the second harmonic processor 31B and the second shifter 30g. The W-phase drive signal generator 33W generates W-phase drive signals gWp and gWn according to the corrected voltage amplitude (Vn+ΔV) on which the voltage harmonic signal Vr is superimposed, the third reference angle θW, and the input voltage VINV. Then, the W-phase drive signal generator 33W outputs the W-phase drive signals gWp and gWn to the control terminals of the respective W-phase switching elements SWp and SWn of the inverter 20, thus controlling on-off operations of the respective switches SWp and SWn.

The following describes detailed operations of each of the U-, V-, and W-phase drive signal generators 33U, 33V, and 33W, which serves as, for example, a switching unit, for generating these switching signals gUp, gUn, gVp, gVn, gWp, and gWn.

At least one of the U-, V-, and W-phase drive signal generators 33U, 33V, and 33W calculates a modulation factor M based on normalization of the input voltage VINV using a voltage amplitude Vk, which will be described later, including the corrected voltage amplitude (Vn+ΔV) on which the amplitude harmonic signal Vr is superimposed. Specifically, at least one of the U-, V-, and W-phase drive signal generators 33U, 33V, and 33W divides the voltage amplitude Vk by half of the input voltage VINV to obtain a quotient, and divides the quotient by $\sqrt{1.5}$, i.e. $\sqrt{\frac{3}{2}}$, thus calculating the modulation factor M.

Each of the U-, V-, and W-phase drive signal generators 33U, 33V, and 33W uses, for example, a map MAP in data-table format, in mathematical expression format, and/or program format; the maps MAP for the respective drive signal generators 33U, 33V, and 33W are for example stored in the memory 30ME.

The map MAP for the U-phase includes, as map data, predetermined waveforms of a drive signal, i.e. predetermined high- and low-level pulse patterns thereof, each correlating with a corresponding one of specified values of the modulation factor M for the U-phase.

Each of the high- and low-level pulse patterns of the drive signal for the U-phase includes high and low pulses, each of which correlates with a corresponding value of the angular range of the first reference angle θU equal to (θe+φ) corresponding to one cycle, i.e. 360 degrees (2π), of the electrical rotational angle θe of the rotor 10a.

The waveform of each of the high- and low-level pulse patterns of the drive signal for the U-phase is antisymmetric about 180 degrees (π) of the rotation angle θe of the rotor 10a. Specifically, in each high- and low-level pulse pattern, if a pulse at any angle relative to 180 degrees within a first range from 180 to 0 degrees of the electrical rotational angle θe is a high level, a pulse at the corresponding angle relative to 180 degrees within a second range from 180 to 360 degrees of the electrical rotational angle θe is a low level, and vice versa.

This waveform of each of the high- and low-level pulse patterns of the drive signal for the U-phase is for example configured to induce a substantially sinusoidal U-phase voltage in the U-phase winding.

Additionally, pieces of map data, i.e. high- and low-level pulse patterns, of the drive signal for the U-phase are stored in the memory 30ME so as to correlate with the respective specified values of the modulation factor M.

The high level in each of the on-off pulse patterns of the drive signal for the U-phase represents an on instruction to switch on a corresponding U-phase switching element, and the low level represents an off instruction to switch off a corresponding U-phase switching element.

Like the U-phase, the map MAP for the V-phase includes, as map data, predetermined waveforms of a drive signal, i.e. predetermined high- and low-level pulse patterns thereof, each correlating with a corresponding one of specified values of the modulation factor M for the V-phase.

Each of the high- and low-level pulse patterns of the drive signal for the V-phase includes high and low pulses, each of which correlates with a corresponding value of the angular range of the second reference angle θV equal to (θe+φ−2π/3) corresponding to one cycle, i.e. 360 degrees (2π), of the electrical rotational angle θe of the rotor 10a.

Similarly, like the U-phase, the map MAP for the W-phase includes, as map data, predetermined waveforms of a drive signal, i.e. predetermined high- and low-level pulse patterns thereof, each correlating with a corresponding one of specified values of the modulation factor M for the W-phase.

Each of the high- and low-level pulse patterns of the drive signal for the W-phase includes high and low pulses, each of which correlates with a corresponding value of the angular range of the second reference angle θW equal to (θe+φ+2π/3) corresponding to one cycle, i.e. 360 degrees (2π), of the electrical rotational angle θe of the rotor 10a.

In particular, for each of the specified values of the modulation factor M, the waveform of a corresponding high- and low-level pulse pattern of the drive signal for the U-phase, the waveform of a corresponding high- and low-level pulse pattern of the drive signal for the V-phase, and the waveform of a corresponding high- and low-level pulse pattern of the drive signal for the W-phase are identical to each other.

Specifically, each of the U-, V-, and W-phase drive signal generator 33U selects a high- and low-level pulse pattern of the drive signal gUp in a corresponding map MAP for a corresponding one of the switching elements SUp, SVp, and SWp; the selected high- and low-level pulse pattern correlates with the calculated value of the modulation factor M.

Then, the U-phase drive signal generator 33U extracts a high- or low-level pulse, i.e. an on or off instruction, from the selected high- and low-level pulse pattern of the drive signal gUp according to every predetermined angular change of the U-phase reference angular signal θU, which is an example of phase information. That is, the extracted high- or low-level pulse corresponds to a present value of the U-phase reference angular signal θU.

Similarly, the V-phase drive signal generator 33V extracts a high- or low-level pulse, i.e. an on or off instruction, from the selected high- and low-level pulse pattern of the drive signal gVp according to every predetermined angular change of the V-phase reference angular signal θV, which is an example of phase information. That is, the extracted high- or low-level pulse corresponds to a present value of the V-phase reference angular signal θV.

In addition, the W-phase drive signal generator 33W extracts a high- or low-level pulse, i.e. an on or off instruction, from the selected high- and low-level pulse pattern of the drive signal gWp according to every predetermined angular change of the W-phase reference angular signal θW, which is an example of phase information. That is, the extracted high- or low-level pulse corresponds to a present value of the W-phase reference angular signal θW.

Note that each of the U-, V-, and W-phase drive signal generators 33U, 33V, and 33W automatically determines a high- or low-level pulse, i.e. an on or off instruction, of a corresponding one of the drive signals g&n as the reverse of the extracted high- or low-level pulse, i.e. on or off instruction extracted for the corresponding drive signal g&p.

Specifically, the U-phase drive signal generator 33U outputs, to the switching element SUp, (1) An on or off instruction of the corresponding drive signal gUp included in a selected common high- and low-level pulse pattern corresponding to a present value of the modulation factor M (2) The reverse of the on or off instruction of the drive signal gUp to the switching signal gUn as the drive signal gUn.

Retarded 120 electrical angular degrees in phase with respect to the output timing of the drive signal gUp, the V-phase drive signal generator 33V outputs, to the switching element SVp, (1) The same on or off instruction of the corresponding drive signal gVp included in the selected common high- and low-level pulse pattern corresponding to a present value of the modulation factor M (2) The reverse of the on or off instruction of the drive signal gVp to the switching signal gVn as the drive signal gVn.

Advanced 120 electrical angular degrees in phase with respect to the output timing of the drive signal gUp, the W-phase drive signal generator 33W outputs, to the switching element SWp, (1) The same on or off instruction of the corresponding drive signal gWp included in the selected common high- and low-level pulse pattern corresponding to a present value of the modulation factor M (2) The reverse of the on or off instruction of the drive signal gWp to the switching signal gWn as the drive signal gWn.

That is, the same on or off instructions are outputted to the respective switching elements SUp, SVp, and SWp with phase differences of 120 electrical degrees (2π/3) therebetween, and the same on or off instructions are outputted to the respective switching elements SUn, SVn, and SWn with phase differences of 120 electrical degrees (2π/3) therebetween. This controls on-off operations of the respective switches S&# such that sinusoidal U-, V-, and W-phase currents, which have phase differences of 120 electrical degrees therebetween, flow through the respective U-, V-, and W-phase windings of the starter of the motor-generator 10.

Figure 3:
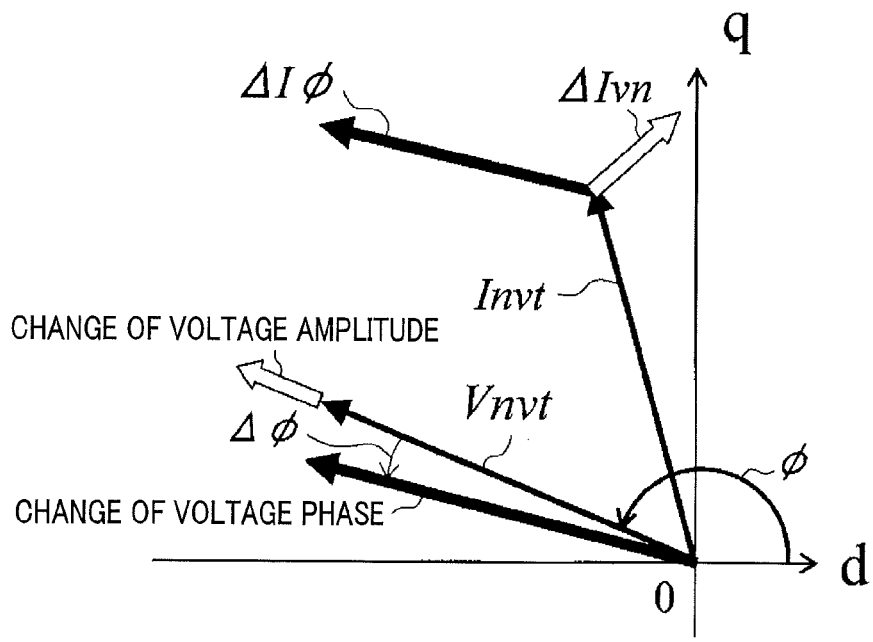
FIG. 3 is a graph schematically illustrating change of a current vector depending on an infinitesimal change of a voltage phase, and change of a current vector as a result of an infinitesimal change of the amplitude of an output voltage vector.
Figure 4:
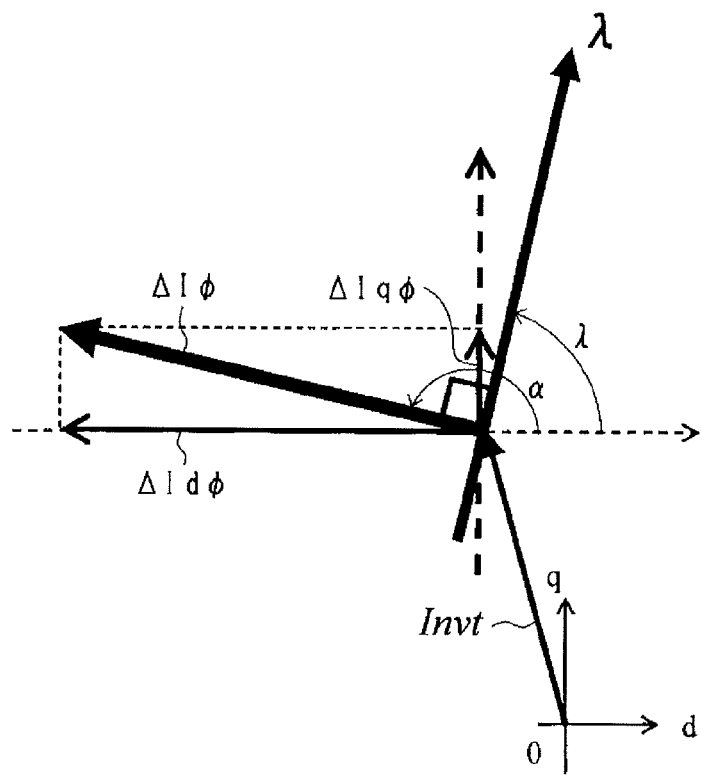
FIG. 4 is a graph, which is an enlarged view of the change the current vector depending on the infinitesimal change of the voltage phase illustrated in FIG. 3.
Figure 5:
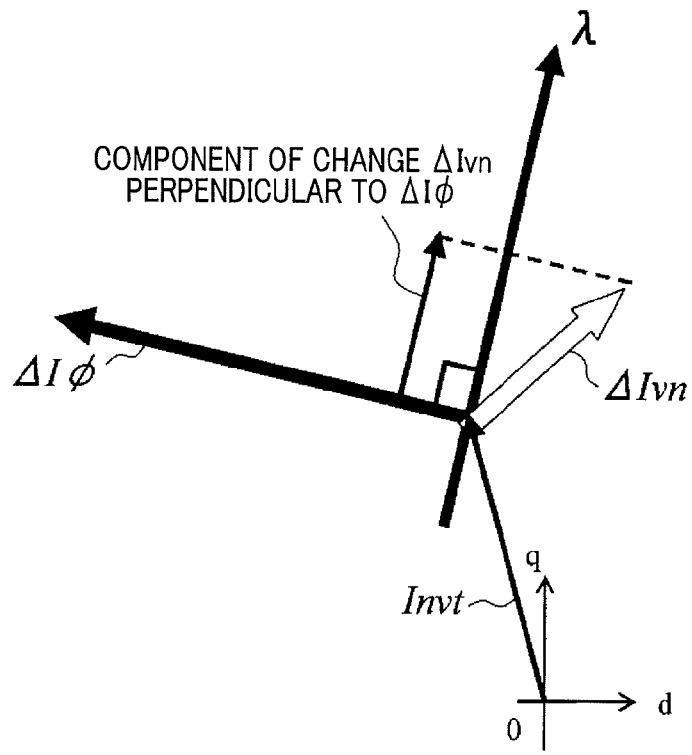
FIG. 5 is a graph schematically illustrating an λ-axis extending perpendicularly with respect to the changing direction of the current vector according to the first embodiment.

Next, the following describes how to design the correction calculator 32, which serves as, for example, a manipulated amplitude variable calculator, with reference to FIGS. 3 to 5.

The following equation [eq1] describes a voltage equation for a permanent-magnet synchronous motor:

$$\begin{bmatrix} Vd \\ Vq \end{bmatrix} = \begin{bmatrix} p \cdot Ld + R & -\omega \cdot Lq \\ \omega \cdot Ld & p \cdot Lq + R \end{bmatrix} \begin{bmatrix} Idr \\ Iqr \end{bmatrix} + \begin{bmatrix} 0 \\ \omega \cdot \psi \end{bmatrix} \quad [\text{eq 1}]$$

Where p represents a differential operator, R represents the resistance of each-phase armature winding, Ld represents the inductance in the d-axis, Lq represents the inductance in the q-axis, and ψ represents an rms value of permanent-magnet flux linkage to each-phase armature winding.

A steady state of the motor-generator 10, in which the rpm of the rotor 10*a* is kept constant, permits a transient state of the motor-generator 10 to be ignorable, resulting in the value of the differential operator p being set to zero. In the steady state of the motor-generator 10, it is assumed that the following conditions are satisfied:

(1) The rpm of the rotor 10*a* of the motor-generator 10 is a sufficiently high value (2) The resistance R of each-phase armature winding is sufficiently smaller than a value of ω·Ld, which is expressed by R<<ω·Ld (3) The resistance R of each-phase armature winding is sufficiently smaller than a value of ω·Lq, which is expressed by R<<w·Lq.

This assumption permits the following voltage equation [eq2] to be derived from the voltage equation [eq1]:

$$\begin{bmatrix} Vd \\ Vq \end{bmatrix} = \begin{bmatrix} 0 & -\omega \cdot Lq \\ \omega \cdot Ld & 0 \end{bmatrix} \begin{bmatrix} Idr \\ Iqr \end{bmatrix} + \begin{bmatrix} 0 \\ \omega \cdot \psi \end{bmatrix} \quad [\text{eq 2}]$$

The correspondence among the d- and q-axis voltage components Vd and Vq, the voltage phase φ, and the value of the amplitude Vn of the output voltage vector Vnvt is given by the following equation [eq3]:

$$\begin{bmatrix} Vd \\ Vq \end{bmatrix} = \begin{bmatrix} Vn \cdot \cos\phi \\ Vn \cdot \sin\phi \end{bmatrix} \quad [\text{eq 3}]$$

A voltage equation of a permanent-magnet synchronous motor when the voltage phase φ changes by an infinitesimal value Δφ is expressed by the following equation [eq4] based on the equations [eq2] and [eq3]:

$$\begin{bmatrix} Vd\phi \\ Vq\phi \end{bmatrix} = \begin{bmatrix} 0 & -\omega \cdot Lq \\ \omega \cdot Ld & 0 \end{bmatrix} \begin{bmatrix} Id\phi \\ Iq\phi \end{bmatrix} + \begin{bmatrix} 0 \\ \omega \cdot \psi \end{bmatrix} \quad [\text{eq 4}]$$

Where $Vd\phi = Vn \cos(\phi+\Delta\phi) = Vn(\cos\phi\cos\Delta\phi - \sin\phi\sin\Delta\phi) \approx Vd - \Delta\phi \cdot Vn\sin\phi$ $Vq\phi = Vn\sin(\phi+\Delta\phi) = Vn(\sin\phi\cos\Delta\phi + \cos\phi\sin\Delta\phi) \approx Vq + \Delta\phi \cdot Vn\cos\phi$ Subtracting the equation [eq2] from the equation [eq4] derives the following equation [eq5]:

$$\begin{bmatrix} Vd\phi - Vd \\ Vq\phi - Vq \end{bmatrix} = \begin{bmatrix} 0 & -\omega \cdot Lq \\ \omega \cdot Ld & 0 \end{bmatrix} \begin{bmatrix} Id\phi - Idr \\ Iq\phi - Iqr \end{bmatrix} \quad [\text{eq 5}]$$

The value (idφ−Idr) at the right side of the equation [eq5] represents a d-axis current change ΔIdφ, and the value (Iqφ−Iqr) at the right side of the equation [eq5] represents a q-axis current change ΔIqφ. Solving the equation [eq5] in terms of the d-axis current change ΔIdφ and the q-axis current change ΔIqφ derives the following equation [eq6]:

$$\begin{bmatrix} \Delta Id\phi \\ \Delta Iq\phi \end{bmatrix} = \begin{bmatrix} 0 & -\omega \cdot Lq \\ \omega \cdot Ld & 0 \end{bmatrix} \begin{bmatrix} Vd\phi - Vd \\ Vq\phi - Vq \end{bmatrix} = \frac{Vn}{\omega} \begin{bmatrix} \frac{\cos\phi}{Ld} \\ \frac{\sin\phi}{Lq} \end{bmatrix} \Delta\phi \quad [\text{eq 6}]$$

FIG. 3 illustrates the voltage vector Vnvt having the voltage phase φ and a current vector Invt based on the voltage vector Vnvt. A current vector Invt is defined as the square root of the sum of the square of a d-axis current Idr and the square of a q-axis current Iqr. FIG. 3 also illustrates change of the current vector Invt depending on an infinitesimal change Δφ of the voltage phase φ using reference character ΔIφ. FIG. 3 further illustrates change of the current vector Invt depending on an infinitesimal change ΔIVn of the amplitude Vn of the output voltage vector Vnvt using reference character ΔIvn.

FIG. 4 is an enlarged view of the change ΔIφ of the current vector Invt depending on the infinitesimal change Δφ of the voltage phase φ. The equation [eq6] permits the change direction a of the current vector Invt with respect to the d-axis depending on the infinitesimal change of the voltage phase φ to be expressed by the following equation [eq7]:

$$\alpha = \tan^{-1}\left(\frac{\Delta Iq\phi}{\Delta Id\phi}\right) = \tan^{-1}\left(\frac{Ld}{Lq}\tan\phi\right) \quad [\text{eq 7}]$$

FIG. 4 shows that the arctangent operation in the equation [eq7] permits the change direction a of the current vector Invt with respect to the d-axis to be calculated between −π and +π inclusive.

The control apparatus 30 according to the first embodiment particularly calculates the change direction a of the current vector Invt with respect to the d-axis as +π/2 when the denominator of $$\frac{\Delta Iq\phi}{\Delta Id\phi}$$

at the right side of the equation [eq7] becomes zero and the numerator thereof becomes a positive value. The control apparatus 30 according to the first embodiment also calculates the change direction a of the current vector Invt with respect to the d-axis as −π/2 when the denominator of $$\frac{\Delta Iq\phi}{\Delta Id\phi}$$

at the right side of the equation [eq7] becomes zero and the numerator thereof becomes a negative value.

FIG. 5 illustrates a coordinate axis, which is referred to as a λ-axis, extending perpendicularly with respect to the changing direction of the current vector Invt. A λ-axis component of the change ΔIvn of the current vector Invt depending on the infinitesimal change ΔVn of the amplitude Vn of the output voltage vector Vnvt means a component of the change ΔIvn of the current vector Invt projected on the λ-axis. The λ-axis component of the change ΔIvn of the current vector Invt illustrated in FIG. 5 is a current independent from change of the voltage phase φ. The correction calculator 32 according to the first embodiment is designed to use the λ-axis component of the change ΔIvn of the current vector Invt for calculation of the amplitude correction ΔV. Using the λ-axis component of the change ΔIvn of the current vector Invt permits interference between the amplitude control and the phase control to be reduced. The angle λ between the d-axis and the λ-axis, which is required to set the λ-axis, is expressed by the following equation [eq8]:

$$\lambda = \alpha - \frac{\pi}{2} = \tan^{-1}\left(\frac{Ld}{Lq}\tan\phi\right) - \frac{\pi}{2} \quad [eq\ 8]$$

Next, the following describes an example of the characteristic structure of the correction calculator 32 based on the design concept set forth above with reference to FIG. 2.

The correction calculator 32 includes a λ-axis setter 32a, a command current setter 32b, a λ-axis command current calculator 32c, a λ-axis actual current calculator 32d, a current deviation calculator 32e, and an amplitude correction calculator 32f.

The λ-axis setter 32a is operatively connected to the phase setter 30d. The λ-axis setter 32a calculates, based on the d- and q-axis inductances Ld and Lq and the voltage phase φ output from the phase setter 30d, the angle λ between the d-axis and a λ-axis in accordance with the equation [eq8]. The λ-axis serves as an interference reduction axis, i.e. a non-interference axis or an independent axis, in the d-q coordinate system. The λ-axis is configured such that a component of change of the current vector Invt, which is projected on the λ-axis, has reduced interferences, for example, no interferences or little interference, from change of the voltage phase φ. In other words, the component of change of the current vector Invt projected on the λ-axis is sufficiently free from interferences from change of the voltage phase φ. The λ-axis set by the λ-axis setter 32a changes depending on change of the driven conditions of the motor-generator 10. Note that the feature that the component of change of the current vector Invt, which is projected on the λ-axis, causes reduced interferences from change of the voltage phase φ can include that both (1) The ?-axis does not interfere at all from change of the voltage phase φ

(2) The λ-axis allows a minimum level of interference from change of the voltage phase φ unless the minimum level of interference reduces the controllability of the controlled variable, such as the estimated torque Te, of the motor-generator 10.

The command current setter 32b sets, based on the target torque, i.e. target torque, Trq*, a d-axis command current Id* and a q-axis command current Iq*. For example, the command current setter 32b according to the first embodiment carries out maximum torque control. Note that the maximum torque control is designed to always achieve a maximum torque at any value of the current vector Invt, in other words, most efficiently achieve the torque of the motor-generator 10 at any value of the current vector Ivnt.

Specifically, the command current setter 32b sets the d-axis command current Id* and a q-axis command current Iq* in accordance with the following equation [eq8a]:

$$Id^* = \frac{\psi}{2(Lq-Ld)} - \sqrt{\frac{\psi^2}{4(Lq-Ld)^2} + Iq^{*2}} \quad [eq\ 8a]$$

For example, the maximum torque control is described on page 23 of "Design and Control of Interior Permanent Magnet Synchronous motor" authored by Takeda et al and published by Ohmsha, Ltd, at page 23.

The λ-axis command current calculator 32c is operatively connected to the λ-axis setter 32a and the command current setter 32b. The λ-axis command current calculator 32c calculates, based on the angle λ set by the λ-axis setter 32a and the d- and q-axis command currents Id* and Iq* set by the command current setter 32b, a λ-axis command current Iλ* in accordance with the following equation [eq9] (see FIG. 6):

$$I\lambda^* = Id^* \cdot \cos\lambda + Iq^* \cdot \sin\lambda \quad [eq9]$$

Figure 6:
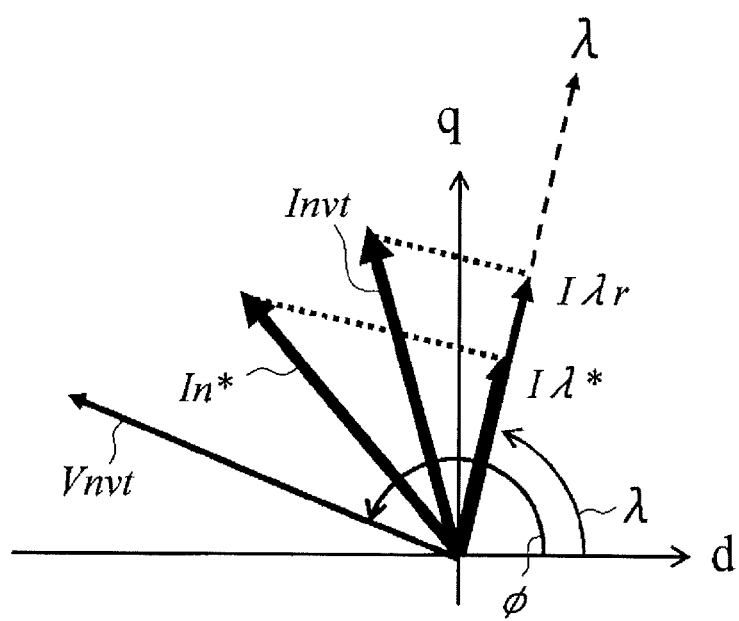
FIG. 6 is a graph schematically illustrating a λ-axis command current in a d-q-coordinate system according to the first embodiment.

Note that FIG. 6 illustrates an actual command current vector In* having the d- and q-axis axis command currents Id* and Iq*, and a present current vector Ivnt having a d-axis current Idr and a q-axis current Iqr actually obtained by the two-phase converter 30a.

The λ-axis actual current calculator 32d is operatively connected to the two-phase converter 30a and the λ-axis setter 32a. The λ-axis actual current calculator 32d calculates, based on the d-axis and q-axis currents Idr and Iqr obtained by the two-phase converter 30a and the angle λ, set by the λ-axis setter 32a, an actual λ-axis current Iλr in accordance with the following equation [eq10] (see FIG. 6):

$$I\lambda r = Idr \cdot \cos\lambda + Iqr \cdot \sin\lambda \quad [eq\ 10]$$

The λ-axis set by the λ-axis setter 32a changes depending on change of the driven conditions of the motor-generator 10. This causes the actual λ-axis current Iλr and the λ-axis command current Iλ* to change depending on change of the drive conditions of the motor-generator 10.

The current deviation calculator 32e is operatively connected to the λ-axis command current calculator 32c and the λ-axis actual current calculator 32d. The current deviation calculator 32e subtracts the λ-axis current Iλr from the λ-axis command current Iλ,* to thereby calculate a current deviation ΔIλ, between the λ-axis current Iλr and the λ-axis command current iλ*. For example, a filter, for example, a low-pass filter, can be provided in the control apparatus 30. The filter can eliminate high-frequency components higher than a predetermined threshold frequency from the λ-axis current Iλr actually obtained by the λ-axis actual current calculator 32d. In this modification, the current deviation calculator 32e can subtract the corrected λ-axis current Iλr output of the filter from the λ-axis command current Iλ,* to thereby calculate the current deviation ΔIλ, between the corrected λ-axis current Iλr and the λ-axis command current iλ*.

The amplitude correction calculator 32f is operatively connected to the current deviation calculator 32e. The amplitude correction calculator 32f, which serves as, for example, an amplitude setter, calculates, based on the current deviation ΔIλ, the amplitude correction ΔV serving as a manipulated variable for feedback controlling the λ-axis current Iλr to match with the λ-axis command current Iλ*, in other words, for feedback controlling the estimated torque Te to match with the target torque Trq*.

Specifically, in the first embodiment, the amplitude correction calculator 32*f* calculates the amplitude correction ΔV in accordance with a predetermined proportional gain and a predetermined integral gain of a PI feedback control algorithm (PI algorithm) using the current deviation ΔIλ as its input.

In the PI algorithm, the amplitude correction ΔV is expressed based on the sum of an output, i.e. a proportional gain term, of a proportional unit based on the proportional gain and an output, i.e. an integral gain term, of an integrator based on the integral gain.

The proportional gain for the amplitude correction ΔV contributes to change in the amplitude correction ΔV in proportion to the temporal current deviation ΔIλ from a target value of zero.

The integral gain is proportional to an accumulated offset of instantaneous values of the current deviation ΔIλ over time to reset the accumulated offset (steady-state deviation) over time to zero.

The configuration of the control apparatus 30 calculates the amplitude correction ΔV based on the λ-axis current Iλr in the λ-axis, which is a non-interference axis having no or little interference from change of the voltage phase thus reducing interference between the amplitude control and the phase control. This configuration permits the proportional gain and the integral gain of the amplitude correction calculator 32*f* to increase. This gain increase improves a response, i.e. a response performance, of the feedback control in the amplitude control up to a level identical to a level of the response of the feedback control in the phase control. This improvement permits the control apparatus 30 to maintain both higher controllability of the torque of the motor-generator 10, and higher controllability of the three-phase currents flowing in the motor-generator 10 even if a disturbance having an influence on the voltage amplitude Vn occurs, or the target torque Trq* transiently changes.

The configuration of the control apparatus 30 also maintains both higher controllability of the torque of the motor-generator 10, and higher controllability of the three-phase currents flowing in the motor-generator 10 even if the feedforward control of the torque of the motor-generator 10 to match with the target torque Trq* is improperly carried out. The improperly execution of the feedforward control includes a case where the information F2 used by the command-voltage setter 30*h* is inappropriately determined.

The following describes the reasons why the control apparatus 30 incorporates therein the first and second harmonic processors 31A and 31B.

As described above, the control apparatus 30 is designed to cause sinusoidal U-, V-, and W-phase currents, which have phase differences of 120 electrical degrees therebetween, to flow through the respective U-, V-, and W-phase windings of the starter of the motor-generator 10 on the precondition that (a) Magnetic characteristics of the motor-generator 10, which include the d- and q-axis inductances Ld and Lq and an induced-voltage constant, are ideal magnetic characteristics (2) The ideal magnetic characteristics can induce ideal sinusoidal three-phase voltages from the respective three-phase windings.

This achieves required torque of the motor-generator 10 with reduced harmonic torque components.

Unfortunately, the magnetic characteristics of the motor-generator 10 may have gaps with respect to the ideal magnetic characteristics due to various causes including the variations in the d- and q-axis inductances Ld and Lq and/or the induced-voltage constant. These gaps may cause each of the U-, V-, and W-phase currents IU, IV, and IW to include harmonic current components as expressed by the following equations [eq11]:

$$\begin{bmatrix} IU \\ IV \\ IW \end{bmatrix} = \begin{bmatrix} Ir1 \cdot \cos(\theta e + \phi 1) + Irk \cdot \cos(k \cdot \theta e + \phi k) \\ Ir1 \cdot \cos\left(\theta e - \frac{2}{3}\pi + \phi 1\right) + Irk \cdot \cos\left(k \cdot \theta e - \frac{2}{3}\pi + \phi k\right) \\ Ir1 \cdot \cos\left(\theta e + \frac{2}{3}\pi + \phi 1\right) + Irk \cdot \cos\left(k \cdot \theta e + \frac{2}{3}\pi + \phi k\right) \end{bmatrix} \quad [\text{eq 11}]$$

Where the right-hand first term of each of the equations [11] represents a fundamental current component having the amplitude of Ir1 and the phase of φ1 of a corresponding one of the U-, V-, and W-phases. The right-hand second term of each of the equations [11] represents harmonic current components having the amplitude of Jr and the phase of φk of a corresponding one of the U-, V-, and W-phases. In other words, the right-hand second term of each of the equations [11] represents that k-th, i.e. (1±6n)-th, harmonic current components are included in each of the U-, V-, and W-phases.

The reference character k is defined as 1±6n where n is an integer other than zero. Harmonic current components, which change at an electrical angular velocity that is k-times higher than the electrical angular velocity ω of the rotor 10*a*, will also be referred to as k-th order harmonic current components or k-th higher-order harmonic current components. That is, the right-hand second term of each of the equations [11] represents k-th order harmonic current components.

The following equation [12] permits the U-, V-, and W-phase currents IU, IV, and IW each including such k-th order harmonic current components to be transformed to d- and q-axis currents Id and Iq in the first-order rotating coordinate system:

$$\begin{bmatrix} Id \\ Iq \end{bmatrix} = \begin{bmatrix} \cos\theta e & \cos\left(\theta e - \frac{2}{3}\pi\right) & \cos\left(\theta e + \frac{2}{3}\pi\right) \\ -\sin\theta e & -\sin\left(\theta e - \frac{2}{3}\pi\right) & -\sin\left(\theta e + \frac{2}{3}\pi\right) \end{bmatrix} \begin{bmatrix} IU \\ IV \\ IW \end{bmatrix} = \quad [\text{eq 12}]$$

$$\begin{bmatrix} Ir1 \cdot \cos\phi 1 + Irk \cdot \cos[(k-1)\theta e + \phi k] \\ Ir1 \cdot \sin\phi 1 + Irk \cdot \sin[(k-1)\theta e + \phi k] \end{bmatrix}$$

Figure 7:
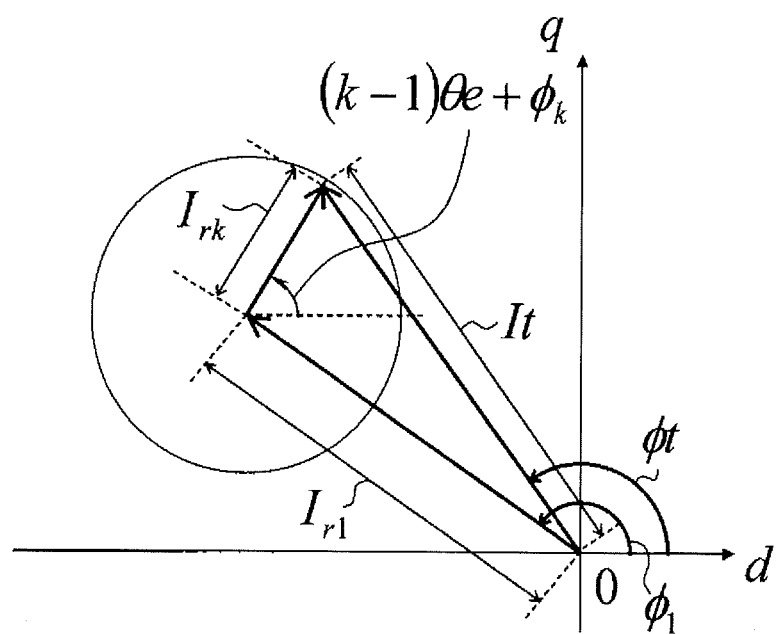
FIG. 7 is a graph schematically illustrating an example of the amplitude and phase of a resultant vector of a fundamental current vector and a k-th harmonic current vector according to the first embodiment.

FIG. 7 illustrates the amplitude It and phase φt of a resultant vector It of a fundamental current vector having an amplitude Ir1 and a phase φ and a k-th harmonic current vector having an amplitude Irk and a phase φk.

The equation [12] shows that k-th, i.e. (1±6n)-th, harmonic current components included in each of the U-, V-, and W-phase currents IU, IV, and IW in the three-phase fixed coordinate system cause (k−1)-th, i.e. ±6n-th, harmonic current components to be included in each of the d- and q-axis currents Id and Iq in the first-order rotating coordinate system.

These (k−1)-th, i.e. ±6n-th, harmonic current components might increase torque variations and/or loss, i.e. iron loss, of the motor-generator 10 if they flowed in the motor-generator 10.

The equation [eq12] shows that superimposing harmonic signals on at least one of the corrected voltage amplitude (V+ΔV) and the voltage phase φ induces, on each phase winding of the motor-generator 10, harmonic voltages having an angular velocity identical to the angular velocity of the superimposed harmonic signals. The induced harmonic voltages having the angular velocity identical to the angular velocity of the superimposed harmonic signals result in harmonic current components, which have an angular velocity identical to the angular velocity of the superimposed harmonic signals, flowing in each of the stator windings of the motor-generator 10.

From these characteristics, superimposing harmonic signals, which can cancel or reduce target harmonic current components, on each of the reference angular signals θU, θV, and θW, permits the target harmonic current components to be cancelled or reduced.

Usual three-phase motor-generators prominently generate (k−1)-th, which is equal to ±6-th, order harmonic current components in the first-order rotating coordinate system, which may have significant impacts on torque of the motor-generator 10.

Thus, the first embodiment aims to reduce such target (k−1)-th, which is equal to ±6-th, order harmonic current components included in each of the d- and q-axis currents in the first-order rotating coordinate system.

That is, superimposing counteracting (k−1)-th, which is equal to 6-th, order harmonic current components on each of the d- and q-axis currents in the first-order rotating coordinate can reduce target (−6)-th order harmonic current components included in a corresponding one of the d- and q-axis currents in the first-order rotating coordinate system. In other words, superimposing counteracting k(=7)-th order harmonic current components on each of the U-, V, and W-phase currents in the three-phase fixed coordinate system enables the counteracting 7-th order harmonic current components to counteract the target (−6)-th order harmonic current components included in each of the d- and q-axis currents in the first-order rotating coordinate system.

In addition, superimposing counteracting (k−1)-th, which is equal to -6-th, order harmonic current components on each of the d- and q-axis currents in the first-order rotating coordinate can reduce target 6-th order harmonic current components included in a corresponding one of the d- and q-axis currents in the first-order rotating coordinate system. In other words, superimposing the counteracting k(=−5)-th order harmonic current components on each of the U-, V, and W-phase currents in the three-phase fixed coordinate system enables the (−5)-th order harmonic current components to counteract the target 6-th order harmonic current components included in each of the d- and q-axis currents in the first-order rotating coordinate system.

Specifically, the harmonic current generator 34 of the first embodiment is configured to generate the fluctuating signal Sigf for superimposing counteracting k(=−5 or 7)-th order harmonic current components on each of the U-, V, and W-phase currents in the three-phase fixed coordinate system. This aims to reduce the target 6-th or −6-th order harmonic current components included in a corresponding one of the d- and q-axis currents in the first-order rotating coordinate system.

Note that, if the polarity of k-th order harmonic currents for respective phase currents is positive, i.e. k>0, the k-th order harmonic currents for the respective phase currents change with positive change of the electrical rotational angle θe of the rotor 10a in the first order of U-, V-, and W-phases. This order agrees with the order of the fundamental current components of the respective U, V, and W-phases. In other words, the travelling direction of the k-th order harmonic currents is identical to that of the fundamental current components if k>0.

In contrast, if the polarity of k-th order harmonic currents for respective phase currents is negative, i.e. k<0, the k-th order harmonic currents for the respective phase currents change with positive change of the electrical rotational angle θe of the rotor 10a in the second order that is opposite to the first order. In other words, the travelling direction of the k-th order harmonic currents is opposite to that of the fundamental current components if k<0.

Figure 8:
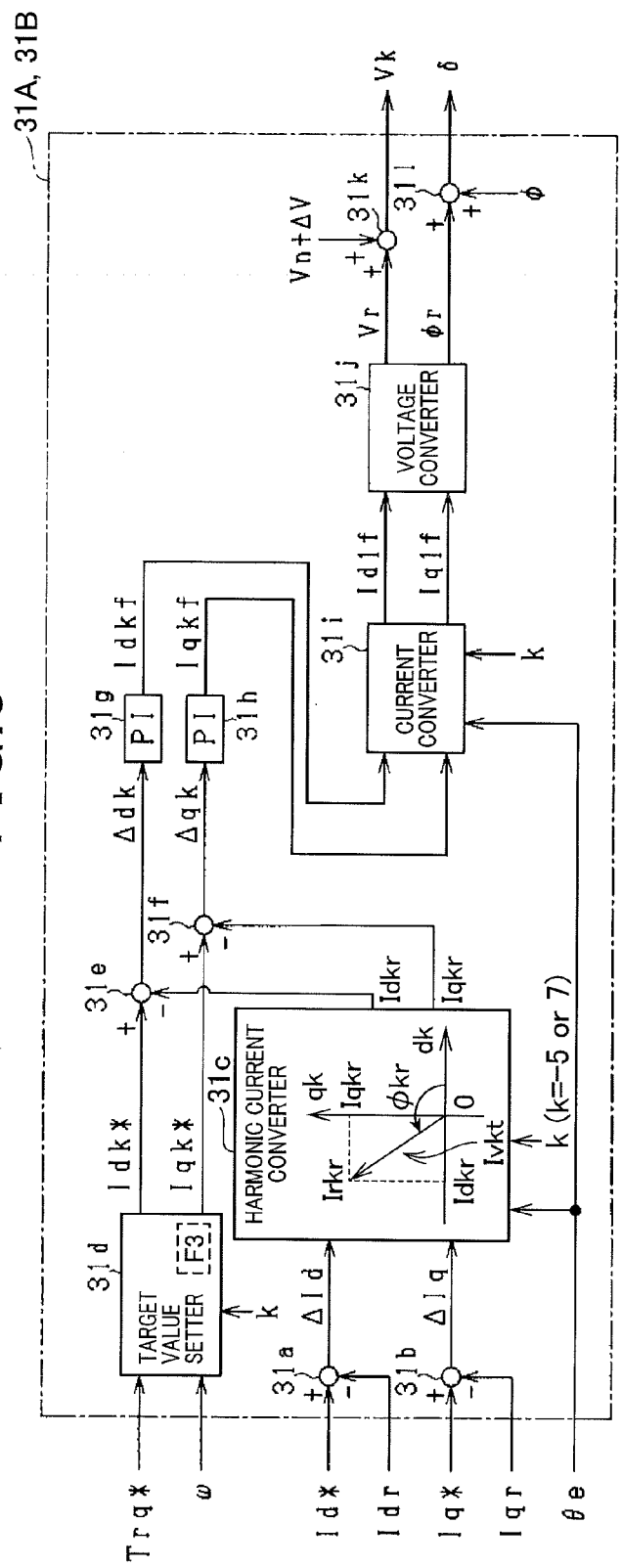
FIG. 8 is a block diagram schematically illustrating an example of the structure of each of a first harmonic processor and a second harmonic processor illustrated in FIG. 2.

Next, the following describes an example of the characteristic structure of each of the first and second harmonic processors 31A and 31B with reference to FIG. 8.

As illustrated in FIG. 8, each of the first and second harmonic processors 31A and 31B includes a d-axis deviation calculator 31a, a q-axis deviation calculator 31b, a harmonic current converter 31c, a target value setter 31d. Each of the first and second harmonic processors 31A and 31B also includes a d-axis harmonic deviation calculator 31e, a q-axis harmonic deviation calculator 31f, a d-axis feedback controller 31g, a q-axis feedback controller 31h, a current converter 31i, and a voltage converter 31j. The first harmonic processor 31A further includes an amplitude superimposer 31k, and the second harmonic processor 31B further includes a phase superimposer 31l. Specifically, the amplitude superimposer 31k can be eliminated from the second harmonic processor 31B, and the phase superimposer 31l can be eliminated from the first harmonic processor 31A.

The d-axis deviation calculator 31a calculates a d-axis current deviation, i.e. d-axis harmonic components, ΔId that is a deviation between the d-axis command current Id* output from the command current setter 32b and the d-axis current Idr output from the two-phase converter 30a. Specifically, the d-axis deviation calculator 34a subtracts the d-axis current Idr from the d-axis command current Id* to thereby calculate the d-axis current deviation ΔId, which serves as, for example, d-axis harmonic current components.

The q-axis deviation calculator 31b calculates a q-axis current deviation, i.e. q-axis harmonic components, ΔIq that is a deviation between the q-axis command current Iq* output from the command current setter 32b and the q-axis current Iqr output from the two-phase converter 30a. Specifically, the q-axis deviation calculator 31b subtracts the q-axis current Iqr from the q-axis command current Iq* to thereby calculate the q-axis current deviation ΔIq, which serves as, for example, q-axis harmonic current components.

The harmonic current converter 31c is operatively connected to the d- and q-axis deviation calculators 31a and 31b. The harmonic current converter 31c converts the d- and q-axis current deviations ΔId and ΔIq in the first-order rotating coordinate system into d- and q-axis k-th order harmonic currents Idkr and Iqkr in a k-th order harmonic rotating coordinate system (dk-qk) using the following equations [eq13] and [eq14] while the k is set to −5 or 7:

$$Idkr = \Delta Id \cdot \cos[(k-1)\theta e] + \Delta Iq \cdot \sin[(k-1)\theta e] \quad [eq13]$$

$$Iqkr = \Delta Iq \cdot \sin[(k-1)\theta e] + \Delta Iq \cdot \cos[(k-1)\theta e] \quad [eq14]$$

Where the right-hand "(k−1)θe" in each of the equations [eq13] and [eq14] represents the phase difference between the d-axis of the first-order rotating coordinate system and the harmonic rotating coordinate system.

Note that the k-th order harmonic rotating coordinate system (dk-qk) (see the block 31c in FIG. 8) is defined as a coordinate system that (1) Has a dk axis as its horizontal axis and a qk axis as its vertical axis (2) Rotates at an angular velocity that is identical to a fluctuating angular velocity of k-th order harmonic current components in the three-phase fixed-coordinate system.

Particularly, the harmonic current converter $31c$ converts the d- and q-axis current deviations $\Delta Id$ and $\Delta Iq$ in the first-order rotating coordinate system into the d- and q-axis k-th order harmonic currents Idkr and Iqkr in the k-th order harmonic rotating coordinate system (dk-qk) while the k is set to −5 or 7.

Note that a vector based on the d- and q-axis k-th order harmonic currents Idkr and Iqkr in the k-th order harmonic rotating coordinate system (dk-qk) will be referred to as a k-th order harmonic current vector Ivkt as illustrated in the block $31c$. The amplitude and phase of the k-th order harmonic current vector Ivkt are expressed by reference characters Ik and $\phi k$. The block $31c$ shows that the counterclockwise direction relative to the positive direction of the d-axis dk in the k-th order harmonic rotating coordinate system (dk-qk) is defined as the positive direction of the phase $\phi k$ of the k-th order harmonic current vector Ivkt. In other words, the rotating direction from the dk axis to the qk axis in the k-th order harmonic rotating coordinate system (dk-qk) is defined as the positive direction of the phase $\phi k$ of the k-th order harmonic current vector Ivkt.

The target value setter $31d$ serves as, for example, a target-value setter. Specifically, the target value setter $31d$ variably sets a target d-axis k-th order harmonic current Idk* and a target q-axis k-th order harmonic current Iqk* for the k-th order harmonic current vector Ivkt according to the target torque Trq* output from the control system 26 and the electrical angular velocity ω output from the velocity calculator $30i$. In particular, the target value setter $31d$ of the first embodiment sets each of the target d- and q-axis k-th order harmonic currents Idk* and Iqk* such that each of the target d- and q-axis k-th order harmonic currents Idk* and Iqk* increases with an increase of the target torque Trq*. The target value setter $31d$ variably sets each of the target d- and q-axis k-th order harmonic currents Idk* and Iqk* to thereby reduce torque variations and/or iron loss of the motor-generator 10. For example, the target value setter $31d$ has information F3 in data-table (map) format, in mathematical expression format, and/or program format.

The information F3, which is for example stored in the memory 30ME, includes a function, i.e. a correlation, of values of the target d-axis k-th order harmonic current Idk* with respect to values of the target torque Trq*; and values of the electrical angular velocity w. The information F3 also includes a function, i.e. a correlation, of values of the target q-axis k-th order harmonic current Iqk* with respect to values of the target torque Trq*; and values of the electrical angular velocity co.

The target value setter $31d$ can retrieve a value of the target d-axis k-th order harmonic current Idk* corresponding to an actual value of the target torque Trq* and an actual value of the electrical angular velocity ω. The target value setter $31d$ can also retrieve a value of the target q-axis k-th order harmonic current Iqk* corresponding to the actual value of the target torque Trq* and the actual value of the electrical angular velocity co.

The d-axis harmonic deviation calculator $31e$ is operatively connected to the harmonic current converter 31 c and the target value setter $31d$. The d-axis harmonic deviation calculator $31e$ calculates a d-axis k-th order deviation $\Delta dk$ that is a deviation between the target d-axis k-th order harmonic current Idk* and the d-axis k-th order harmonic current Idkr while k is set to 7 or −5. Specifically, the d-axis harmonic deviation calculator $31e$ subtracts the d-axis k-th order harmonic current Idkr from the target d-axis k-th order harmonic current Idk* to thereby calculate the d-axis k-th order deviation $\Delta dk$.

The q-axis harmonic deviation calculator $31f$ is operatively connected to the harmonic current converter $31c$ and the target value setter $31d$. The q-axis harmonic deviation calculator $31f$ calculates a q-axis k-th order deviation $\Delta qk$ that is a deviation between the target q-axis k-th order harmonic current Iqk* and the q-axis k-th order harmonic current Iqkr while k is set to 7 or −5. Specifically, the q-axis harmonic deviation calculator $31f$ subtracts the q-axis k-th order harmonic current Iqkr from the target q-axis k-th order harmonic current Iqk* to thereby calculate the q-axis k-th order deviation $\Delta qk$.

The d-axis feedback controller $31g$ is operatively connected to the d-axis harmonic deviation calculator $31e$. The d-axis feedback controller $31g$ calculates, based on the d-axis k-th order deviation $\Delta dk$, a d-axis feedback current Idkf serving as a manipulated variable for feedback controlling the d-axis k-th order harmonic current Idkr to match with the target d-axis k-th order harmonic current Idk*. Specifically, in the first embodiment, the d-axis feedback controller $31g$ calculates the d-axis feedback current Idkf in accordance with a predetermined proportional gain and a predetermined integral gain of a PI feedback control algorithm (PI algorithm) using the d-axis k-th order deviation $\Delta dk$ as its input.

In the PI algorithm, the d-axis feedback current Idkf is expressed based on the sum of an output, i.e. a proportional gain term, of a proportional unit based on the proportional gain and an output, i.e. an integral gain term, of an integrator based on the integral gain.

The proportional gain for d-axis feedback current Idkf contributes to change in the d-axis feedback current Idkf in proportion to the temporal d-axis k-th order deviation $\Delta dk$ from a target value of zero.

The integral gain is proportional to an accumulated offset of instantaneous values of the d-axis k-th order deviation $\Delta dk$ over time to reset the accumulated offset (steady-state deviation) over time to zero.

The q-axis feedback controller $31h$ is operatively connected to the q-axis harmonic deviation calculator $31f$. The q-axis feedback controller $31h$ calculates, based on the q-axis k-th order deviation $\Delta qk$, a q-axis feedback current Iqkf serving as a manipulated variable for feedback controlling the q-axis k-th order harmonic current Iqkr to match with the target q-axis k-th order harmonic current Iqk*. Specifically, in the first embodiment, the q-axis feedback controller $31h$ calculates the q-axis feedback current Iqkf in accordance with a predetermined proportional gain and a predetermined integral gain of a PI feedback control algorithm (PI algorithm) using the q-axis k-th order deviation $\Delta qk$ as its input.

In the PI algorithm, the q-axis feedback current Iqkf is expressed based on the sum of an output, i.e. a proportional gain term, of a proportional unit based on the proportional gain and an output, i.e. an integral gain term, of an integrator based on the integral gain.

The proportional gain for q-axis feedback current Iqkf contributes to change in the q-axis feedback current Iqkf in proportion to the temporal q-axis k-th order deviation $\Delta qk$ from a target value of zero.

The integral gain is proportional to an accumulated offset of instantaneous values of the q-axis k-th order deviation $\Delta qk$ over time to reset the accumulated offset (steady-state deviation) over time to zero.

The current converter $31i$ is operatively connected to each of the B- and q-axis feedback controllers $31g$ and $31h$. The current converter $31i$ converts the d- and q-axis k-th order feedback currents Idkf and Iqkf in the k-th order harmonic rotating coordinate system (dk-qk) into a d-axis harmonic current Id1f and a q-axis harmonic current Iq1f in the first-order rotating coordinate system, i.e. the d-q coordinate system, using the following equation [eq15]:

$$\begin{bmatrix} Id1f \\ Iq1f \end{bmatrix} = \begin{bmatrix} \cos[(k-1)\theta e] & -\sin[(k-1)\theta e] \\ \sin[(k-1)\theta e] & \cos[(k-1)\theta e] \end{bmatrix} \begin{bmatrix} Idkf \\ Iqkf \end{bmatrix} \quad [eq\ 15]$$

The voltage converter 31j is operatively connected to the current converter 31i. The voltage converter 31j calculates, based on the d- and q-axis harmonic currents Id1f and Iq1f, the amplitude harmonic signal Vr and the phase harmonic signal φr.

Specifically, the voltage converter 31j converts the d- and q-axis harmonic currents Id1f and Iq1f into d- and q-axis harmonic voltages Vd1f and Vq1f using the following equation [eq 16]:

$$\begin{bmatrix} Vd1f \\ Vq1f \end{bmatrix} = \begin{bmatrix} R & -\omega \cdot Lq \\ \omega \cdot Ld & R \end{bmatrix} \begin{bmatrix} Id1f \\ Iq1f \end{bmatrix} \quad [eq\ 16]$$

Next, the voltage converter 31j calculates, based on the d- and q-axis harmonic voltages Vd1f and Vq1f, the amplitude harmonic signal Vr and the phase harmonic signal φr in accordance with the following equations [eq17] and [eq18]:

$$Vr = \sqrt{Vd1f^2 + Vq1f^2} \quad [eq\ 17]$$

$$\phi r = \tan^{-1}\left(\frac{Vq1f}{Vd1f}\right) \quad [eq\ 18]$$

The arctangent operation in the equation [eq18] permits the phase harmonic signal φr to be calculated between $-\pi$ and $+\pi$ inclusive. In particular, the voltage converter 31j according to the first embodiment calculates the phase harmonic signal φr as $+\pi/2$ when the denominator of $$\frac{Vq1f}{Vd1f}$$

at the right hand of the equation [eq18] becomes zero and the numerator thereof becomes a positive value. The voltage converter 31j also calculates the phase harmonic signal φr as $-\pi/2$ when the denominator of $$\frac{Vq1f}{Vd1f}$$

at the right hand of the equation [eq18] becomes zero and the numerator thereof becomes a negative value.

For example, subtracting the equation [eq2] from the following voltage equation [eq19] including a fundamental current component and the d- and q-axis harmonic current components Id1 f and Iqif leads to the above equation [eq16].

$$\begin{bmatrix} Vd + Vd1f \\ Vq + Vq1f \end{bmatrix} = \begin{bmatrix} 0 & -\omega \cdot Lq \\ \omega \cdot Ld & 0 \end{bmatrix} \begin{bmatrix} Id + Id1f \\ Iq + Iq1f \end{bmatrix} + \begin{bmatrix} 0 \\ \omega \cdot \psi \end{bmatrix} \quad [eq\ 16]$$

The amplitude superimposer 31k is operatively connected to the voltage converter 31j. The amplitude superimposer 31k superimposes the amplitude harmonic signal Vr on the corrected voltage amplitude (Vn+ΔV) output from the corrector 30k, thus outputting, to each of the U-, V-, and W-phase signal generator 33U, 33V, and 33W, a voltage amplitude Vk on which the amplitude harmonic signal Vr is superimposed.

The phase superimposer 31l is operatively connected to the voltage converter 31j. The phase superimposer 31l superimposes the phase harmonic signal φr on the voltage phase φ output from the phase setter 30d, thus outputting, to each of the U-, V-, and W-phase signal generator 33U, 33V, and 33W, a voltage phase δ on which the phase harmonic signal φr is superimposed.

As described above, at least one of the U-, V-, and W-phase drive signal generators 33U, 33V, and 33W calculates the modulation factor M based on normalization of the input voltage VINV using the voltage amplitude Vk including the corrected voltage amplitude (Vn+ΔV) on which the amplitude harmonic signal Vr is superimposed. The amplitude harmonic signal Vr is based on the d- and q-axis feedback currents Idkf and Iqkf in the k-th order harmonic rotating coordinate system (dk-qk) while the k is set to −5 or 7.

Then, each of the U-, V-, and W-phase signal generator 33U, 33V, and 33W selects a high- and low-level pulse pattern of a corresponding drive signal g&p in a corresponding map MAP for a corresponding one of the switching elements SUp, SVp, and SWp; the selected high- and low-level pulse pattern correlates with the calculated value of the modulation factor M.

This induces, on each phase winding of the motor-generator 10, harmonic voltages having an angular velocity identical to the angular velocity of the superimposed amplitude harmonic signal Vr. The induced harmonic voltages having the angular velocity identical to the angular velocity of the superimposed amplitude harmonic signal Vr result in counteracting harmonic current components, which have an angular velocity identical to the angular velocity of the superimposed amplitude harmonic signal Vr, flowing in each of the stator windings of the motor-generator 10.

Additionally, each of the modules 30e, 30f, and 30g outputs, to a corresponding one of the U-, V-, and W-phase signal generator 33U, 33V, and 33W, a corresponding one of the first, second, and third reference angles θU (=θe+δ), second reference angle θV (=θe+δ−2π/3), and third reference angle θW (=θe+δ+2π/3). On the voltage phase δ, the phase harmonic signal φr, which is based on the d- and q-axis feedback currents Idkf and Iqkf in the k-th order harmonic rotating coordinate system (dk-qk) while the k is set to −5 or 7, is superimposed.

Then, each of the U-, V-, and W-phase signal generator 33U, 33V, and 33W extracts a high- or low-level pulse from a selected high- and low-level pulse pattern of a corresponding drive signal according to every predetermined angular change of a corresponding one of the first, second, and third reference angles θU, θV, and θW.

This therefore induces, on each phase winding of the motor-generator 10, harmonic voltages having an angular velocity identical to the angular velocity of the superimposed phase harmonic signal φr. The induced harmonic voltages having the angular velocity identical to the angular velocity of the superimposed phase harmonic signal φr result in counteracting harmonic current components, which have an angular velocity identical to the angular velocity of the superimposed phase harmonic signal φr, flowing in each of the stator windings of the motor-generator 10.

In particular, setting k of each of the amplitude harmonic signal Vr and the phase harmonic signal φr to −5 generates counteracting −6-th harmonic current components superimposed in each of the d- and q-axis currents. The counteracting −6-th harmonic current components in each of the d- and q-axis currents reduces the target +6-th order harmonic current components included in a corresponding one of the d- and q-axis currents in the first-order rotating coordinate system.

Additionally, setting k of each of the amplitude harmonic signal Vr and the phase harmonic signal φr to 7 generates counteracting +6-th harmonic current components superimposed in each of the d- and q-axis currents. The counteracting +6-th harmonic current components in each of the d- and q-axis currents reduces the target −6-th order harmonic current components included in a corresponding one of the d- and q-axis currents in the first-order rotating coordinate system.

Reducing the target +6-th harmonic current components or the target −6-th harmonic current components induced in each of the d- and q-axis currents reduces torque variations and/or loss, i.e. iron loss, of the motor-generator 10 due to the target +6-th harmonic current components or the target −6-th harmonic current components.

Moreover, each of the harmonic processors 31a and 31b of the control apparatus 30 variably sets, according to the target torque Trq* and the electrical angular velocity a, the target d- and q-axis k-th order harmonic currents Idk* and Iqk* to reduce torque variations and/or iron loss of the motor-generator 10. Then, each of the harmonic processors 31a and 31b adjusts a corresponding one of the amplitude harmonic signal Vr and the phase harmonic signal φr such that the d- and q-axis k-th order harmonic currents Idkr and Iqkr match with the respective target d- and q-axis k-th order harmonic currents Idk* and Iqk*.

This configuration of each of the harmonic processors 31a and 31b further contributes to more reduction of torque variations and/or loss, i.e. iron loss, of the motor-generator 10 due to the target −6-th harmonic current components or the target 6-th harmonic current components.

Second Embodiment

A control apparatus 30A for the motor-generator 10 according to the second embodiment of the present disclosure will be described with reference to FIG. 9.

Some of the structure and/or functions of the control apparatus 30A according to the second embodiment are different from the control apparatus 30 according to the first embodiment by the following points. So, the different points will be mainly described hereinafter.

The control apparatus 30A includes a first harmonic processor 31A1 and a second harmonic processor 31B1. The first harmonic processor 31A1 of the second embodiment is configured to generate (1) A first amplitude harmonic signal Vr1 for superimposing k(=−5)-th order harmonic current components on each of the U-, V, and W-phase currents in the three-phase fixed coordinate system (2) A second harmonic signal Vr2 for superimposing k(=7)-th order harmonic current components on each of the U-, V, and W-phase currents in the three-phase fixed coordinate system.

The second harmonic processor 31B1 of the second embodiment is configured to generate (1) A first phase harmonic signal φr1 for superimposing k(=−5)-th/ order harmonic current components on each of the U-, V, and W-phase currents in the three-phase fixed coordinate system (2) A second phase harmonic signal φr2 for superimposing k(=7)-th order harmonic current components on each of the U-, V, and W-phase currents in the three-phase fixed coordinate system.

This aims to reduce both the target ±6-th order harmonic current components included in each of the d- and q-axis currents in the first-order rotating coordinate system.

Figure 9:
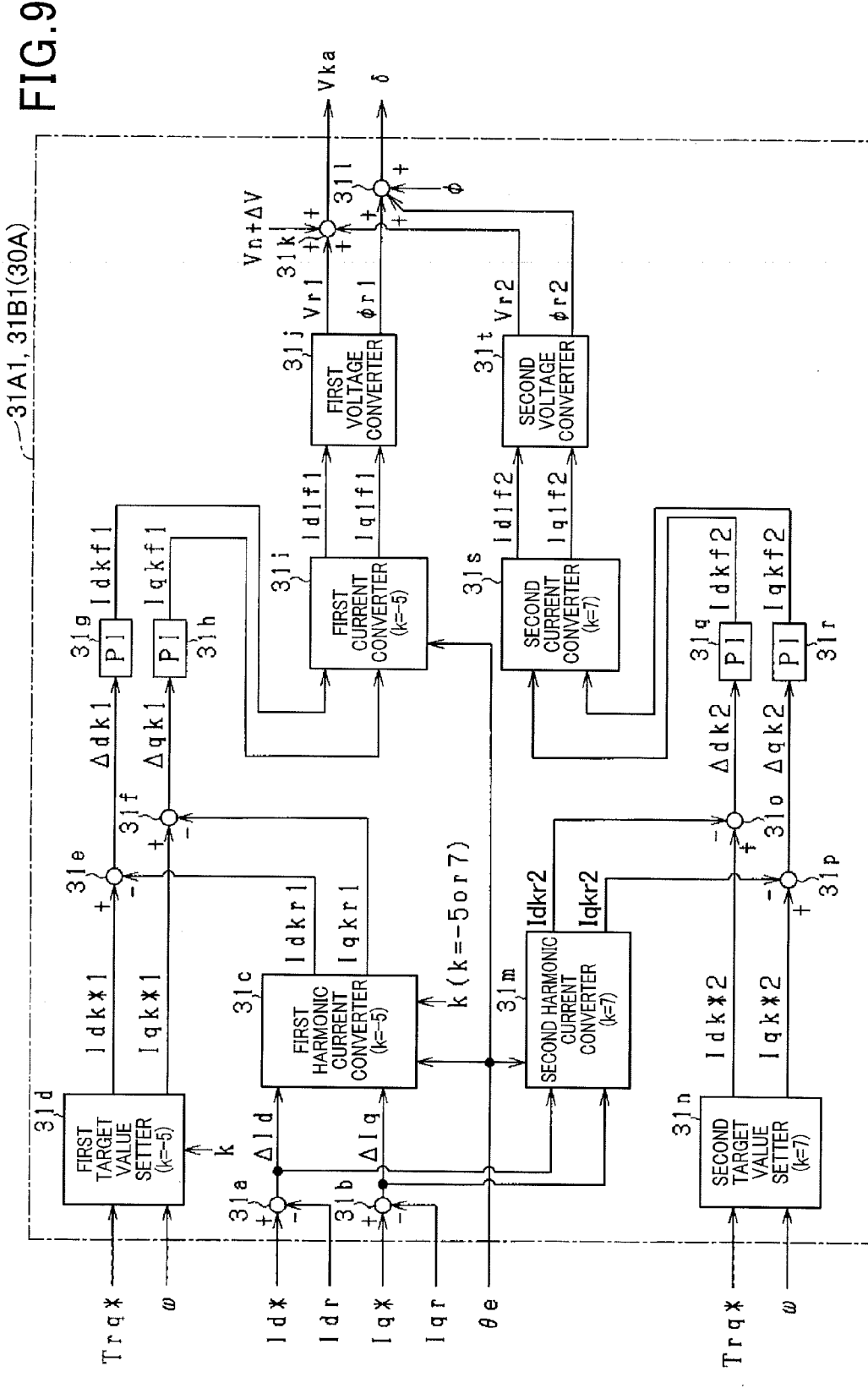
FIG. 9 is a block diagram schematically illustrating an example of the structure of each of a first harmonic processor and a second harmonic processor according to the second embodiment of the present disclosure.

Next, the following describes an example of the characteristic structure of each of the first and second harmonic processors 31A1 and 31B1 with reference to FIG. 9. In FIG. 9, identical modules between each of the first and second harmonic processors 31A1 and 31B1 and a corresponding one of the first and second harmonic processors 31A and 31B illustrated in FIG. 8, to which identical reference characters are assigned, are omitted in description, and the different modules will be mainly described hereinafter.

The second embodiment describes the modules 31c, 31d, 31e, 31f, 31g, 31h, 31i, and 31j illustrated in FIG. 8 as respective first harmonic current converter 31c, first target value setter 31d, first d-axis harmonic deviation calculator 31e, first q-axis harmonic deviation calculator 31f, first d-axis feedback controller 31g, first q-axis feedback controller 31h, first current converter 31i, and first voltage converter 31j.

The d- and q-axis k-th order harmonic currents Idkr and Iqkr output from the first harmonic current converter 31c will be referred to as first d- and q-axis k-th order harmonic currents Idkr1 and Iqkr1. The target d- and q-axis k-th order harmonic currents Idk* and Iqk* output from the first target value setter 31d will be referred to as first target d- and q-axis k-th order harmonic currents Idk*1 and Iqk*1. The d- and q-axis k-th order deviations Δdk and Δqk output from the respective first d- and q-axis harmonic deviation calculators 31e and 31f will be referred to as respective first and second d- and q-axis k-th order deviations Δdk1 and Δqk1.

The d- and q-axis feedback currents Idkf and Iqkf output from the first d- and q-axis feedback controllers 31g and 31h will be referred to as respective first and second d- and q-axis feedback currents Idkf1 and Iqkf1. The d- and q-axis harmonic currents Id1f and Iq1f output from the first current converter 31i will be referred to as respective first d- and q-axis harmonic currents Id1f1 and Iq1f1. The amplitude harmonic signal Vr and phase harmonic signal φr output from the first voltage converter 31j will be referred to as respective first amplitude harmonic signal Vr1 and first phase harmonic signal φr1. The first amplitude harmonic signal Vr1 and first phase harmonic signal φr1 serve to superimpose k(=−5)-th order harmonic current components on each of the U-, V, and W-phase currents in the three-phase fixed coordinate system. Thus, the k-th order harmonic rotating coordinate system used for each of the first harmonic processors 31A1 and 31B1, which will be referred to as a first k-th order harmonic rotating coordinate system, is defined as a coordinate system that (1) Has a dk axis as its horizontal axis and a qk axis as its vertical axis (2) Rotates at an angular velocity identical to an angular velocity of the k(=−5)-th order harmonic current components in the three-phase fixed coordinate system.

Additionally, each of the first and second harmonic processors 31A1 and 31B1 includes second harmonic current converter 31m, second target value setter 31n, second d-axis harmonic deviation calculator 31o, second q-axis harmonic deviation calculator 31p, second d-axis feedback controller 31q, second q-axis feedback controller 31r, second current converter 31s, and second voltage converter 31 t.

These modules 31m to 31t generate the second amplitude harmonic signal Vr2 and second phase harmonic signal φr2 for superimposing k(=7)-th order harmonic current components on each of the U-, V, and W-phase currents in the three-phase fixed coordinate system. That is, operations of these modules 31m to 31t are substantially identical to those of the modules 31c to 31j except that the parameter k representing the order of the harmonic current components to be superimposed on each phase current is set to 7.

Specifically, the second harmonic current converter 31m converts the d- and q-axis current deviations ΔId and ΔIq in the first-order rotating coordinate system into second d- and q-axis k-th order harmonic currents Idkr2 and Iqkr2 in a second k-th order harmonic rotating coordinate system (dk-qk) using the above equations [eq13] and [eq14] while the k is set to 7.

Note that the second k-th order harmonic rotating coordinate system is defined as a coordinate system that (1) Has a dk axis as its horizontal axis and a qk axis as its vertical axis (2) Rotates at an angular velocity identical to an angular velocity of the k(=7)-th order harmonic current components in the three-phase fixed coordinate system.

The second target value setter 31 iniably sets a second target d-axis k-th order harmonic current Idk*2 and a second target q-axis k-th order harmonic current Iqk*2 for a second k(=7)-th order harmonic current vector Ivkt2 according to the target torque Trq* and the electrical angular velocity w using, for example, the information F3. The second target value setter 31d variably sets each of the second target d- and q-axis k-th order harmonic currents Idk*2 and Iqk*2 to thereby reduce torque variations and/or iron loss of the motor-generator 10.

The second d-axis harmonic deviation calculator 31o calculates a second d-axis k-th order deviation Δdk2 that is a deviation between the second target d-axis k-th order harmonic current Idk*2 and the second d-axis k-th order harmonic current Idkr2 while k is set to 7.

The second q-axis harmonic deviation calculator 31p calculates a second q-axis k-th order deviation Δqk2 that is a deviation between the second target q-axis k-th order harmonic current Iqk*2 and the second q-axis k-th order harmonic current Iqkr2 while k is set to 7.

The second d-axis feedback controller 31q calculates, based on the second d-axis k-th order deviation Δdk2, a second d-axis feedback current Idkf2 serving as a manipulated variable for feedback controlling the second d-axis k-th order harmonic current Idkr2 to match with the second target d-axis k-th order harmonic current Idk*2.

The second q-axis feedback controller 31r calculates, based on the second q-axis k-th order deviation Δqk2, a second q-axis feedback current Iqkf2 serving as a manipulated variable for feedback controlling the second q-axis k-th order harmonic current Iqkr2 to match with the second target q-axis k-th order harmonic current Iqk*2.

The second current converter 31s converts the second d- and q-axis k-th order feedback currents Idkf2 and Iqkf2 in the k-th order harmonic rotating coordinate system (dk-qk) into a second d-axis harmonic current Id1f2 and a second q-axis harmonic current Iqlf2 in the first-order rotating coordinate system, i.e. the d-q coordinate system, using the above equation [eq15].

The second voltage converter 31t calculates, based on the second B- and q-axis harmonic currents Id1f2 and Iqlf2, the second amplitude harmonic signal Vr2 and the second phase harmonic signal φr2 in the same approach as the first voltage converter 31j.

The amplitude superimposer 31k is operatively connected to both the first and second voltage converters 31j and 31t. The amplitude superimposer 31k superimposes the first and second amplitude harmonic signals Vr1 and Vr2 on the corrected voltage amplitude (Vn+ΔV) output from the corrector 30k, thus outputting, to each of the U-, V-, and W-phase signal generator 33U, 33V, and 33W, a voltage amplitude Vka on which the first and second amplitude harmonic signals Vr1 and Vr2 are superimposed.

The phase superimposer 31l is operatively connected to both the first and second voltage converters 31j and 31t. The phase superimposer 31l superimposes the first and second phase harmonic signals φr1 and φr2 on the voltage phase φ output from the phase setter 30d, thus outputting, to each of the U-, V-, and W-phase signal generator 33U, 33V, and 33W, a voltage phase δa on which the first and second phase harmonic signals φr1 and φr2 are superimposed.

The configuration of the control apparatus 30A superimposes both the counteracting −6-th harmonic current components and the counteracting +6-th harmonic current components in each of the d- and q-axis currents. The counteracting −6-th harmonic current components in each of the d- and q-axis currents reduces the target +6-th order harmonic current components included in a corresponding one of the d- and q-axis currents in the first-order rotating coordinate system. Additionally, the counteracting +6-th harmonic current components in each of the d- and q-axis currents reduces the target −6-th order harmonic current components included in a corresponding one of the d- and q-axis currents in the first-order rotating coordinate system. This further reduces torque variations and/or loss, i.e. iron loss, of the motor-generator 10 due to both the target +6-th harmonic current components and the target −6-th harmonic current components.

Each of the first and second embodiments can be modified as follows.

Each of the first and second harmonic processors 31A and 31B of the first embodiment can obtain the d- and q-axis k-th order harmonic currents Idk and Iqk using the following method different from the above method disclosed in the first embodiment.

Specifically, each of the first and second harmonic processors 31A and 31B can be configured to calculate, based on the d- and q-axis command currents Id* and Iq*, a fundamental current component in the three-phase fixed coordinate system. Then, each of the first and second harmonic processors 31A and 31B can be configured to subtract, from each of the U-, V-, and W-phase currents IU, IV, and IW, the calculated fundamental current component, thus extracting k-th harmonic current components. Then, each of the first and second harmonic processors 31A and 31B can be configured to directly convert the k-th harmonic current components into d- and q-axis k-th order harmonic currents Idk and Iqk in the k-th order harmonic rotating coordinate system without using the first-order rotating coordinate system.

The target value setter 31d can variably set the d- and q-axis k-th order harmonic currents Idk* and Iqk* according to any one of the target torque Trq* and the electrical angular velocity ω. The target value setter 31d can set each of the d- and q-axis k-th order harmonic currents Idk* and Iqk* to a corresponding one of predetermined fixed values.

The d-axis deviation calculator 31a of the first embodiment calculates the d-axis harmonic components ΔId that is a deviation between the d-axis command current Id* and the d-axis current Idr, but the present disclosure is not limited thereto. Specifically, the d-axis deviation calculator 31a can serve as a bandpass filter or a high-pass filter to filter the d-axis current Idr to thereby extract d-axis harmonic components from the d-axis current Idr as the d-axis current deviation ΔId. Similarly, the q-axis deviation calculator 31b can serve as a bandpass filter or a high-pass filter to filter the q-axis current Iqr to thereby extract q-axis harmonic components from the q-axis current Iqr as the q-axis current deviation ΔIq.

The control apparatus 30A according to the second embodiment is configured to reduce first target −5-th order harmonic current components and second target 7-th order harmonic current components, but can be configured to reduce three or more orders of harmonic current components in the same manner as the method disclosed in the second embodiment.

The correction calculator 32 of each of the control apparatuses 30 and 30A can calculate the amplitude correction ΔV serving as a manipulated variable for feedback controlling the d-axis current Idr to match with the d-axis command current Id* in the same manner as a method disclosed in Japanese Patent Application Publication No. 2012-23943.

Each of the first and second embodiments can eliminate the correction calculator 32 from each of the control apparatuses 30 and 30a. In other words, the amplitude control of each of the control apparatuses 30 and 30a does not essentially require the feedback control for the voltage amplitude.

Each of the U-, V-, and W-phase drive signal generators 33U, 33V, and 33W uses the map MAP. The map MAP for each phase has stored therein predetermined high- and low-level pulse patterns of a corresponding-phase drive signal; each of the high- and low-level pulse patterns correlates with a corresponding one of specified values of the modulation factor M for a corresponding one of the U-, V-, and W-phases. The present disclosure is however not limited to the structure. Specifically, the map MAP for each phase can have stored therein predetermined high- and low-level pulse patterns of a corresponding-phase drive signal; each of the high- and low-level pulse patterns correlates with a corresponding one of specified values of the corrected voltage amplitude (Vn+ΔV) for a corresponding one of the U-, V-, and W-phases.

Each of the first and second embodiments uses an IPMSM as an example of rotary machines, but can use another type rotary machine, such as an SPMSM or a wound-field synchronous motor. Rotary machines according to the present disclosure are not limited to synchronous machines. An SPMSM used as the motor-generator 10 according to the first embodiment permits a q-axis current to be used as a controlled variable of the SPMSM because the torque of the SPMSM is defined based on the q-axis current. Induction machines can be used as rotary machines according to the present disclosure. Various types of rotary machines according to the present disclosure can be installed in various types of vehicles, such as an electric automobile. Rotary machines to which the present disclosure is applied are not limited to a component, such as a main engine, of vehicles. Specifically, rotary machines to which the present disclosure is applied can be installed in electric power steering systems and electrical compressors for air conditioning systems.

Each of the control apparatuses 30 and 30A uses estimated torque Te that is a parameter indicative of a controlled variable of the motor-generator 10, but the present disclosure is not limited thereto. Another controlled variable, such as rotational speed of the rotor 10a, of the motor-generator 10 can be used.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for feedback controlling a controlled variable of a rotary machine to thereby rotate a rotor relative to a stator using power obtained by a power converter, the apparatus comprising:
   a phase setter configured to:
   set a phase of an output voltage vector of the power converter in a rotating coordinate system, the phase of the output voltage vector serving as a first manipulated variable for feedback controlling the controlled variable of the rotary machine to a target value; and
   output phase information including the phase of the output voltage and an electrical rotational angle of the rotor,
   the rotating coordinate system rotating as the rotor of the rotary machine rotates;
   an amplitude setter configured to set an amplitude of the output voltage vector of the power converter in the rotating coordinate system, the amplitude of the output voltage vector serving as a second manipulated variable for feedback controlling the controlled variable of the rotary machine to the target value;
   a storage configured to store therein on-off switching patterns of a switching element of the power converter, the on-off switching patterns being provided for respective predetermined values of an amplitude parameter depending on the amplitude of the output voltage vector;
   a switching unit configured to:
   select one of the on-off switching patterns corresponding to a specified value of the amplitude parameter;
   extract an on or off instruction from the selected one of the on-off switching patterns according to a change of the phase information output from the phase setter; and
   switch on or off the switching element according to the extracted on or off instruction;
   a target harmonic current obtainer configured to obtain, according to a phase current flowing through at least one phase winding of the stator, a target harmonic current component flowing in the rotary machine, the target harmonic current component correlating with a fundamental current component of the phase current; and
   an inducing unit configured to superimpose, on at least one of the amplitude and the phase of the output voltage vector used by the switching unit, a harmonic signal to induce a counteracting harmonic current component in the at least one phase winding, the harmonic signal changing at an angular velocity identical to an angular velocity of the target harmonic current component, the counteracting harmonic current component counteracting the target harmonic current component.

2. The apparatus according to claim 1, wherein:
   the angular velocity of the target harmonic current component is k times higher than the electrical angular velocity of the rotor, k being a variable set to 1±6n where n is an integer other than zero; and the inducing unit further comprises:
a harmonic signal generator configured to generate the harmonic signal according to the target harmonic current component, the phase current, and the electrical rotational angle of the rotor,
the harmonic signal changing at an angular velocity that is (k−1) times higher than the electrical rotational angle of the rotor; and
a superimposer configured to superimpose the harmonic signal on at least one of the amplitude and the phase of the output voltage vector used by the switching unit.

3. The apparatus according to claim 2, wherein the target harmonic current obtainer further comprises:
a harmonic-current component calculator configured to convert the target harmonic current component into a target higher-order harmonic current component in a second rotating coordinate system, the second rotating coordinate system rotating at an angular velocity identical to the angular velocity of the target higher-order harmonic current component,
the harmonic signal generator being configured to generate, based on the target higher-order harmonic current component, the harmonic signal that serves to induce, as the counteracting harmonic current component, a counteracting order harmonic current component for reducing the target higher-order harmonic current component.

4. The apparatus according to claim 3, wherein:
the harmonic-current component calculator is configured to calculate a d-axis higher-order harmonic current component and a q-axis higher-order harmonic current component, the d-axis higher-order harmonic current component being a current component of the target higher-order harmonic current component in a first axis of the second rotating coordinate system, and the q-axis higher-order harmonic current component being a current component of the target higher-order harmonic current component in a second axis of the second rotating coordinate system, the first axis being electromagnetically perpendicular to each other,
the harmonic-current component calculator further comprising:
a d-axis manipulated-variable calculator configured to calculate a d-axis manipulated variable for feedback controlling the d-axis higher-order harmonic current component to match with a predetermined target d-axis higher-order harmonic current; and
a q-axis manipulated-variable calculator configured to calculate a q-axis manipulated variable for feedback controlling the q-axis higher-order harmonic current component to match with a predetermined target q-axis higher-order harmonic current, and
the harmonic signal generator further comprises:
a harmonic signal generator configured to:
generate, based on the d-axis manipulated variable, an amplitude harmonic signal, the amplitude harmonic signal comprising a harmonic component of the amplitude of the output voltage vector in the first rotating coordinate system; and
generate, based on the q-axis manipulated variable, a phase harmonic signal, the phase harmonic signal comprising a harmonic component of the phase of the output voltage vector in the first rotating coordinate system, and
the superimposer is configured to:
superimpose the amplitude harmonic signal on the amplitude of the output voltage vector used by the switching unit; and
superimpose the phase harmonic signal on the phase of the output voltage vector used by the switching unit.

5. The apparatus according to claim 4, wherein the harmonic signal generator further comprises:
a target-value setter configured to variably set the target d-axis higher-order harmonic current and the target q-axis higher-order harmonic current according to at least one of the target value for the controlled variable of the motor-generator and the electrical angular velocity of the rotor.

6. The apparatus according to claim 4, further comprising:
a two-phase converter configured to convert the phase current into a d-axis current in the first axis of the first rotating coordinate system and a q-axis current in the second axis of the first rotating coordinate system,
wherein:
the voltage amplitude setter is configured to set the amplitude of the output voltage vector according to a d-axis command value for the d-axis current and a q-axis command value for the q-axis current,
the target harmonic current obtainer is configured to:
obtain a d-axis deviation between the d-axis command current and the d-axis current as a d-axis harmonic current component; and
obtain a q-axis deviation between the q-axis command current and the q-axis current as a q-axis harmonic current component, and
the harmonic-current component calculator is configured to calculate the d-axis higher-order harmonic current component and q-axis higher-order harmonic current component according to the respective d-axis harmonic current component and q-axis harmonic current component.

7. The apparatus according to claim 5, further comprising:
a two-phase converter configured to convert the phase current into a d-axis current in the first axis of the first rotating coordinate system and a q-axis current in the second axis of the first rotating coordinate system,
wherein:
the voltage amplitude setter is configured to set the amplitude of the output voltage vector according to a d-axis command value for the d-axis current and a q-axis command value for the q-axis current,
the target harmonic current obtainer is configured to:
obtain a d-axis deviation between the d-axis command current and the d-axis current as a d-axis harmonic current component; and
obtain a q-axis deviation between the q-axis command current and the q-axis current as a q-axis harmonic current component, and
the harmonic-current component calculator is configured to calculate the d-axis higher-order harmonic current component and q-axis higher-order harmonic current component according to the respective d-axis harmonic current component and q-axis harmonic current component.

8. The apparatus according to claim 2, wherein the target harmonic current component includes a plurality of harmonic current components, the angular velocities of the plurality of harmonic current components being k times higher than the electrical angular velocity of the rotor, the angular velocities of the plurality of harmonic current components differing from each other.

* * * * *